US008578350B2

(12) United States Patent
Miller

(10) Patent No.: US 8,578,350 B2
(45) Date of Patent: Nov. 5, 2013

(54) SYSTEM AND METHOD FOR INTERPRETING A SPECIFICATION LANGUAGE FILE TO IMPLEMENT A BUSINESS SYSTEM

(75) Inventor: David D. Miller, Easley, SC (US)

(73) Assignee: NCR Corporation, Duluth, GA (US)

( * ) Notice: Subject to any disclaimer, the term of this patent is extended or adjusted under 35 U.S.C. 154(b) by 1440 days.

(21) Appl. No.: 11/606,683

(22) Filed: Nov. 30, 2006

(65) Prior Publication Data

US 2008/0134155 A1 Jun. 5, 2008

(51) Int. Cl.
*G06F 9/45* (2006.01)

(52) U.S. Cl.
USPC .......................................................... 717/139

(58) Field of Classification Search
USPC ................. 717/105–106, 108, 114, 120, 124, 717/139–143; 709/203, 204, 217–227, 250, 709/201; 716/103; 715/205, 239, 709, 202, 715/234, 513; 718/102; 235/375, 432; 705/3, 7.27, 1.1, 16, 43; 719/328; 707/103 Y
See application file for complete search history.

(56) References Cited

U.S. PATENT DOCUMENTS

| | | | |
|---|---|---|---|
| 5,920,718 A | 7/1999 | Uczekaj et al. | |
| 6,301,703 B1 | 10/2001 | Shank et al. | |
| 6,477,439 B1 | 11/2002 | Bernaden, III et al. | |
| 6,560,771 B1 | 5/2003 | Yotsukura | |
| 6,694,505 B1 | 2/2004 | Tan | |
| 6,898,783 B1 | 5/2005 | Gupta et al. | |
| 6,925,632 B2 | 8/2005 | Shiu | |
| 7,046,778 B2 * | 5/2006 | Martin et al. | 379/201.01 |
| 7,630,908 B1 * | 12/2009 | Amrien et al. | 705/3 |
| 2003/0014439 A1 | 1/2003 | Boughannam | |
| 2003/0204444 A1 * | 10/2003 | Van Luchene et al. | 705/16 |
| 2003/0217005 A1 * | 11/2003 | Drummond et al. | 705/43 |
| 2005/0027871 A1 * | 2/2005 | Bradley et al. | 709/227 |
| 2005/0028174 A1 * | 2/2005 | Rossmann et al. | 719/328 |
| 2005/0044197 A1 * | 2/2005 | Lai | 709/223 |
| 2005/0055631 A1 * | 3/2005 | Scardina et al. | 715/513 |
| 2005/0097128 A1 * | 5/2005 | Ryan et al. | 707/103 Y |
| 2005/0234844 A1 | 10/2005 | Ivanov | |
| 2006/0026073 A1 * | 2/2006 | Kenny et al. | 705/16 |
| 2006/0225032 A1 * | 10/2006 | Klerk et al. | 717/105 |
| 2006/0248112 A1 | 11/2006 | Williams et al. | |
| 2006/0277248 A1 * | 12/2006 | Baxter et al. | 709/201 |

FOREIGN PATENT DOCUMENTS

| | | |
|---|---|---|
| WO | WO 02/10975 | 2/2002 |
| WO | WO 02/101579 | 12/2002 |

* cited by examiner

*Primary Examiner* — Tuan A Vu
(74) *Attorney, Agent, or Firm* — Paul J. Maginot; Harden E. Stevens, III

(57) ABSTRACT

A system controls operation of a business system having a processor, memory, and a hard drive. The system comprises a specification language file stored on a hard drive, the file containing specification language statements defining a state machine implementation of a business system, a parser for extracting specification language statements from the specification language file and interpreting the extracted specification language statements, a business logic application program comprised of business logic modules, the business logic modules including executable compiled program statements, and the parser calls at least one of the business logic modules to process a message extracted by the parser from the specification language file.

19 Claims, 26 Drawing Sheets

FIG. 3

```
<state-machine>
    <library-list>      ...   </library-list>
    <timer-list>              ...   </timer-list>
    <constant-list>     ...   </constant-list>
    <variable-list>     ...   </variable-list>
    <state-list>              ...   </state-list>
    <msg-list>          ...   </msg-list>
    <action-list>             ...   </action-list>
    <lookup-table>            </lookup-table>
    <property-list>           </property-list>
    <rules>                   ...   </rules>
```

FIG. 4

```
  <library-list>
<library name="RCMgr.dll">
   <comment>This library contains the actions for the
          Remote Console Manager</comment>
</library>
  </library-list>
```

FIG. 5

```
<timer-list>
   <timer name="some_timer_name">
      <comment>Some Comment</comment>
  </timer>
</timer-list>
```

FIG. 6

```
<constant-list">
   <constant name="my_constant" value="1500">
      <comment>Some comment</comment>
   </constant>
</constant-list">
```

FIG. 7

```
<variable-list>
   <variable name="my_variable"
      initial-value="0" max-value="100"
      min-value="0">
      <comment>Some comment</comment>
   </variable>
    </variable-list>
```

FIG. 8

```
    <state-list>
  <state-definition name="First State">
     <comment> Some comment </comment>
     <initial/>
  </state-definition>
    </state-list>
```

FIG. 9

```
  <msg-list>
<msg-definition name="Message – Name">value="0x00000001">
   <comment>Some comment </comment>
</msg-definition>
  </msg-list>
```

FIG. 10

```
<action-list">
   <action name="MyAction">
      <comment>Some comment</comment>
   </action>
<action-list>
```

FIG. 11

```
   <lookup-table name="InputEvent" key-type="int" value-type="string">
  <lookup-entry key="1" value="message-name=PS Help"/>
  <lookup-entry key="2" value="message-name=PS Help"/>
  <lookup-entry key="3" value="message-name=PS Help"/>
</lookup-table>
```

FIG. 12

```
      <rules>
     <state>
         <state-name>State-1</state-name>
         <message>
                 <message-name>Message-1</message-name>
                 <message-rule-list>
                         <if expression="variable==0">
                                 <rule action-name=.../>
                         </if>
                         <success-transition>...</ success-transition >
                 </message-rule-list>
         </message>
...
     </state>
...
   </rules>
```

FIG. 13

```
<rules>
  <state>
     <state-name>State-1</state-name>
      <message>
             <message-name>Message-1</message-name>
             <message-rule-list>
                           <if expression="variable==0">
                                  <rule action-name=.../>
                           </if>
                    <else>
                           <rule action-name=.../>
                    </else>
                    <success-transition>...</ success-transition >
             </message-rule-list>
     </message>
...
  </state>
...
 </rules>
```

FIG. 14

```
     <rules>
    <state>
       <state-name>State-1</state-name>
       <message>
              <message-name>Message-1</message-name>
              <message-rule-list>
                            <if expression="variable==0">
                                   <rule action-name=.../>
                            </if>
                     <else-if expression="variable==1">
                            <rule action-name=.../>
                     </else-if>
                            <else>
                                   <rule action-name=.../>
                            </else>
...           </message-rule-list>
        <message>
...
    </state>
```

FIG. 15

```
    <rules>
  <state>
     <state-name>State-1</state-name>
     <message>
             <message-name>Message-1</message-name>
             <message-rule-list>
                     <select>
                     </select>
             </message-rule-list>
     </message>
...
  </state>
...
 </rules>
```

FIG. 16

```
    <rules>
  <state>
     <state-name>State-1</state-name>
     <message>
             <message-name>Message-1</message-name>
             <message-rule-list>
                     <select>
                             <when expression="variable==1">
                                     <rule action-name=.../ >
                             </when>
                             <when expression="variable==1">
                                     <rule action-name=.../ >
                             </when>
                             <when expression="variable==1">
                                     <rule action-name=.../ >
                             </when>
                     </select>
             </message-rule-list>
     </message>
...
  </state>
...
 </rules>
```

FIG. 17

```
    <rules>
  <state>
     <state-name>State-1</state-name>
      <message>
            <message-name>Message-1</message-name>
            <message-rule-list>
                    <select>
                         <when expression="variable==1">
                                 <rule action-name=.../>
                         </when>
                         <otherwise>
                                 <rule action-name=.../>
                         </otherwise>
                    </select>
            </message-rule-list>
     </message>
...
  </state>
...
 </rules>
```

FIG. 18

```
    <rules>
  <state>
     <state-name>State-1</state-name>
     <message>
            <message-name>Message-1</message-name>
            <message-rule-list>
                    <for variable="x"
                                 initial-value="0"
                                 limit="3"
                                 increment="1">
                                 <rule .../>
                    </for>
            </message-rule-list>
            </message>
```

FIG. 19

```
  <rules>
 <state>
   <state-name>State-1</state-name>
   <message>
          <message-name>Message-1</message-name>
          <message-rule-list>
                 <while expression="x!=0">
                              <rule.../>
                 </while>
          </message-rule-list>
   </message>
...
 </state>
...
</rules>
```

FIG. 20

```
<rules>
   <state>
      <state-name>State-1</state-name>
      <timeout-rule-list timer-name="timer1">
             <rule action-name=.../>
             <rule action-name=.../>
                                   ...
             <rule action-name=.../>
      </timeout-rule-list>
...
   </state>
...
 </rules>
```

FIG. 21

```
  <rules>
 <state name="State-1/>
   <message-rule-list>
          <rule .../>
                                   ...
          <break/>
   </message-rule-list>
...
 </state>
...
</rules>
```

```
<rules>
<state name="State-1"/>
  <message-rule-list>
    <rule .../>
              ...
       <yield/>
  </message-rule-list>
...
</state>
...
</rules>
```

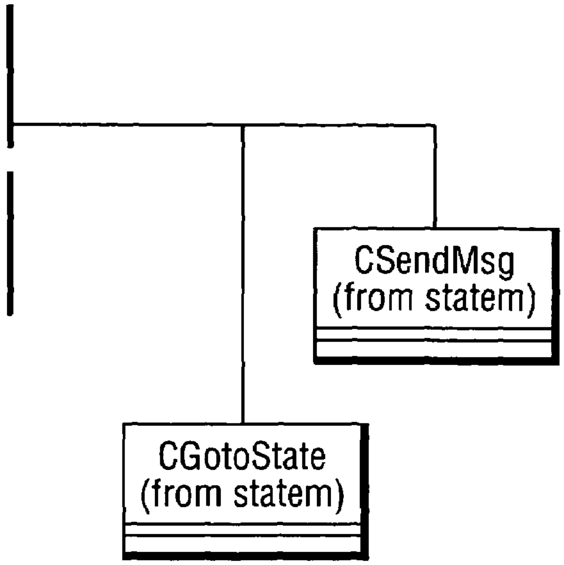
FIG. 25H
FIG. 25
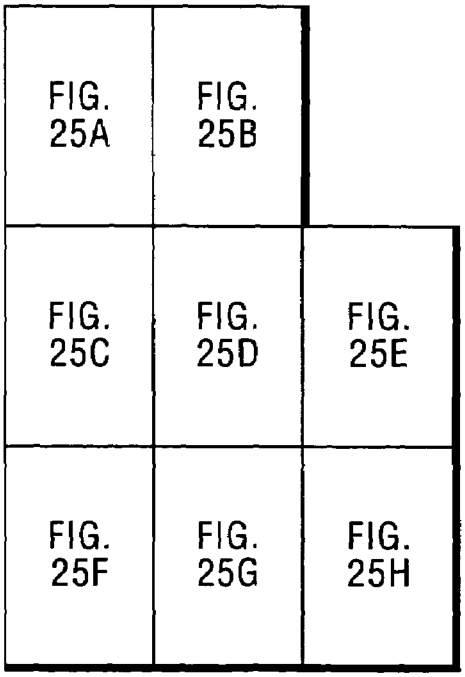

SYSTEM AND METHOD FOR INTERPRETING A SPECIFICATION LANGUAGE FILE TO IMPLEMENT A BUSINESS SYSTEM

TECHNICAL FIELD

This disclosure relates to business systems implemented with computers, and, more particularly, to business systems implemented with computers for processing business transactions at a point-of-sale.

BACKGROUND

Business systems may be described as computer systems programmed to facilitate a business transaction or function. For example, a computer may be programmed to accept input from a user and to detect events as they occur in a particular environment to account for transactions and report a log of transaction events. These reports may be used by management to distill information about a business operation or to modify various aspects of a business for improved efficiency. For example, an inventory management system may be comprised of a computer that is programmed to verify transactions, to record product as it is received into inventory, and to update product accumulations upon the exit of product from the inventory. Data used for these transactions may be entered through a keyboard or through a barcode reader and the like. This system may subsequently generate one or more reports to inform management of current inventory levels and the volume levels of transactions that have occurred.

Another commonly encountered business system is a checkout station, which is typically used at retail point-of-sale locations. These point-of-sale (POS) stations may be as simple as an electronic cash register or as complex as a self-checkout station. The more complex POS systems include a keypad for entry of commands from an operator, sensors for reading barcodes and weighing items, and databases and communication equipment for reading and storing data as well as communicating data to remote sites, respectively. These POS systems are well known. At these POS stations, articles for purchase are scanned so they may be identified. The terminals enable prices to be retrieved from a central repository to support more flexible article pricing. When all items for purchase have been presented at a POS terminal, a subtotal is accumulated, any taxes or discounts are computed, and a total amount due is displayed for the consumer. The POS terminal or station may also include a cash register function, a credit or debit card reader, or a smart card interface for processing payment for the transaction. Upon confirmation of the tendered payment, the articles are released to the consumer. Once a sale is consummated, the station may communicate with an inventory management system to update inventory for the sold items.

A POS checkout station typically includes a terminal, a scanner/scale for reading unit price codes (UPC) and determining article weight, a cashier key pad and display, a POS terminal for payment entry, a receipt printer, a change unit, and a checkout area for holding articles once they have been scanned. The POS terminal also includes a display, a processor, memory, programmed instructions, and data peripherals to control the operations of the station. The programmed instructions may contain modules that query a database for article prices, compute totals, and perform other functions related to the purchase of articles through the checkout station. Some checkout stations may also include a security application program that uses data from sensors such as scales and/or cameras, to reduce the likelihood that improper article substitution occurs during checkout.

Checkout stations are manufactured by a number of different companies. While the operations of POS systems are generally alike, each manufacturer implements the program code to perform the transactions differently. For example, the codes generated by keys in the key pads or the interfaces with sensor systems may be implemented in slightly different manners from manufacturer to manufacturer. Consequently, the programming executed by the processor or processors of a POS system differs from manufacturer to manufacturer.

Rather than having one single program that implements all the functionality required for a checkout station, most manufacturers implement a POS system controller with some type of modular programming. In modular programming, the business logic implemented by the POS system is segmented into subfunctions. These sub-functions may be implemented as discrete programming objects or modules. These modules or objects are provided with input data which the object or modules process to produce output. This modular approach to programming is used to facilitate maintenance of the computer program and to compartmentalize the functionality of the system so it may be modified to incorporate new functions more easily.

While the modules and objects discussed above do facilitate program maintenance and adaptability, they are typically coupled together in a hierarchical structure to implement a transaction or other business process. The hierarchy and control logic used to couple the modules together is also implemented in a programming language. The programming statements that implement the control logic and hierarchy form a framework for the POS system. These program statements must be compiled and installed on a computer in order to control the execution of the program objects and modules used to implement the various subfunctions of the POS system. Implementing all the control logic of the POS system in this manner is contrary to the principles of modular programming. In the event that the control logic must change to process transactions, the programming statements for the business logic must be revised, re-complied, and re-installed on the computer that implements the POS system. Additionally, the changes must be reprogrammed in a manner that is compatible with the manufacturer's platform on which the programming logic executes. That is, the business logic must be modified in a way that is compatible with the manufacturer's implementation of the sub-functions. Thus, modification of the control logic that performs the business logic for a POS system requires careful attention to the hardware environment for the system and the programming language used to implement the system.

SUMMARY

A system controls operation of a business system having a processor, memory, and a hard drive in a manner that provides flexibility without having to recompile executable computer logic. The system comprises a specification language file stored on a hard drive, the file containing specification language statements defining a state machine implementation of a business system, a parser for extracting specification language statements from the specification language file and interpreting the extracted specification language statements, a business logic application program comprised of business logic modules, the business logic modules including executable compiled program statements, and the parser calls at least one of the business logic modules to process a message extracted by the parser from the specification language file.

A method that may be implemented by such a system controls operation of a business system in a manner that provides flexibility without having to recompile executable computer logic. The method includes defining with specification language statements a state machine implementation of a business system, interpreting the specification language statements to implement the business system, and calling a business logic module containing executable compiled program statements to process a message extracted by the parser from an interpreted specification language statement.

Advantages and features of the system and method discussed in this disclosure may be discerned from reviewing the accompanying drawings and the detailed description below.

BRIEF DESCRIPTION OF THE DRAWINGS

The system and method described in this disclosure may take form in various components and arrangement of components and in various methods. The drawings are only for purposes of illustrating exemplary embodiments and alternatives and are not to be construed as limiting the invention.

FIG. 3 is an example of an XML file structure that may be used to define a state machine.

FIG. 4 is an example of a library definition that may be used in the file structure of FIG. 3.

FIG. 5 is an example of a timer definition that may be used in the file structure of FIG. 3.

FIG. 6 is an example of a constant definition that may be used in the file structure of FIG. 3.

FIG. 7 is an example of a variable definition that may be used in the file structure of FIG. 3.

FIG. 8 is an example of a state definition that may be used in the file structure of FIG. 3.

FIG. 9 is an example of a message definition that may be used in the file structure of FIG. 3.

FIG. 10 is an example of an action definition that may be used in the file structure of FIG. 3.

FIG. 11 is an example of a lookup table definition that may be used in the file structure of FIG. 3.

FIG. 12 is an example of an if expression that may be used in the file structure of FIG. 3.

FIG. 13 is an example of an else expression that may be used in the if expression of FIG. 12.

FIG. 14 is an example of an else-if expression that may be used in the file structure of FIG. 3.

FIG. 15 is an example of a select expression that may be used in the file structure of FIG. 3.

FIG. 16 is an example of a when expression that may be used in the file structure of FIG. 3.

FIG. 17 is an example of an otherwise expression that may be used in the file structure of FIG. 3.

FIG. 18 is an example of a for expression that may be used in the file structure of FIG. 3.

FIG. 19 is an example of a while expression that may be used in the file structure of FIG. 3.

FIG. 20 is an example of a timeout-rule-list expression that may be used in the file structure of FIG. 3.

FIG. 21 is an example of a break expression that may be used in the file structure of FIG. 3.

DETAILED DESCRIPTION

Figure 1:
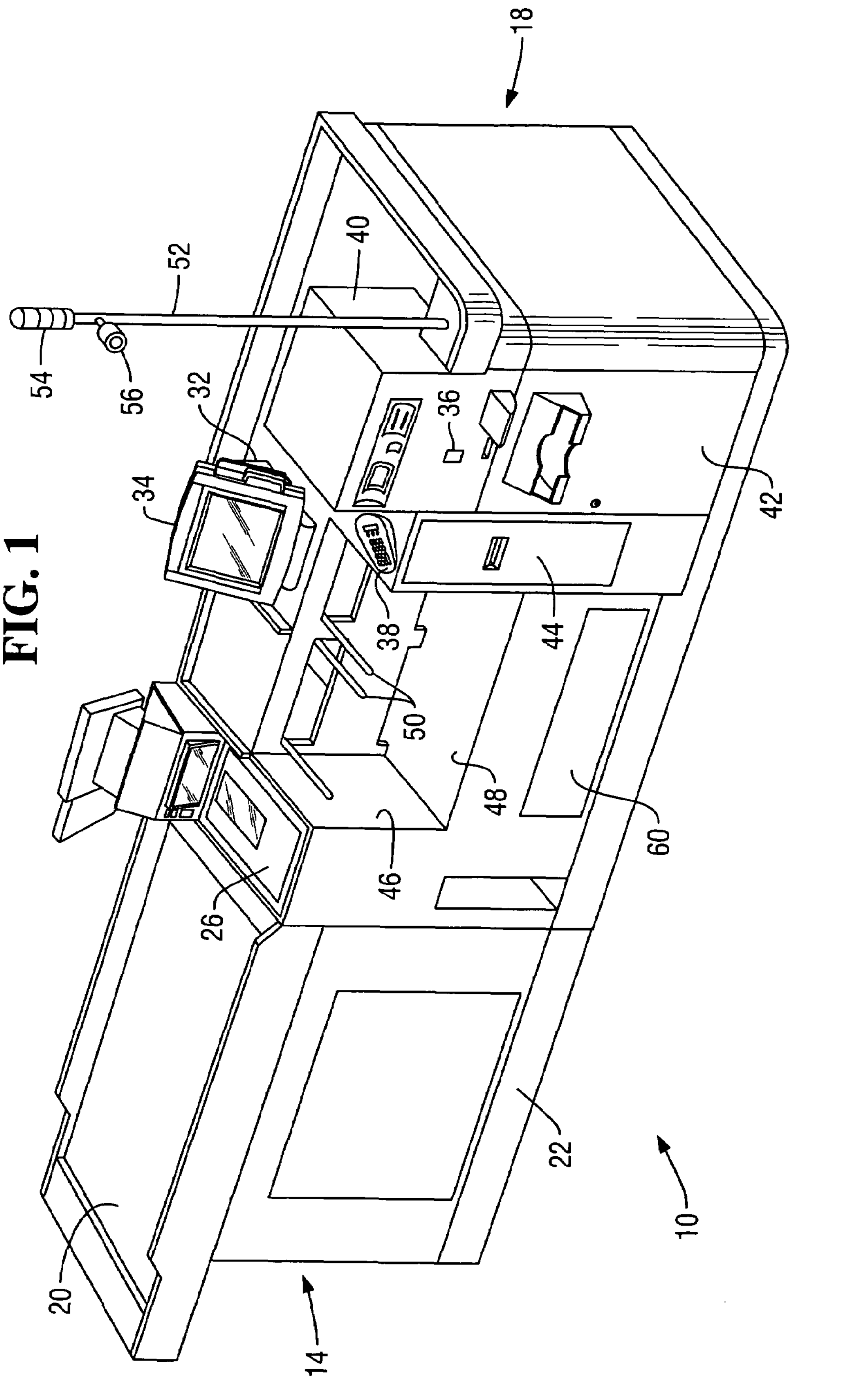
FIG. 1 depicts a perspective view of a checkout station having a specification language file interpreter for implementing business logic and the checkout station.

A checkout station that may be modified in accordance with the principles of the present invention is shown in FIG. 1. Checkout station 10 may include a feeder unit 14 and a checkstand 18. Feeder unit 14 includes a feeder belt 20 and housing 22 for the motor and control circuitry that operates feeder belt 20. Feeder unit 14 is movably coupled to checkstand 18 so the feeder belt may be aligned with scanner/scale unit 26. Checkstand 18 includes scanner/scale unit 26, consumer terminal 34, a payment terminal 38 for entry of payment data, and receipt printer 44. Scanner/scale unit 26 uses a laser shining on a glass or other transparent platen to input data from bar codes applied to products or packages. Unit 26 may also include a scale for measuring the weight of articles that are sold on a price/unit of weight basis. Consumer terminal 34 displays article data as it is entered through scanner/scale unit 26. Payment terminal 38 may be any known POS terminal that incorporates a card reader 32 to support credit card, debit card, and other payment methods. Receipt printer 44 provides a consumer with a receipt itemizing the articles purchased and the method of payment.

Receipt printer 44 and scanner/scale unit 26 may be separated by a bag well 46 having a security scale 48 for its floor. Bags for storing articles that consumers have scanned and weighed are hung from hanging rails 50 in bag well 46. Security scale 48 uses article weight data derived from scanner/scale 26 or a database using a scanned unit product code (UPC) to verify that only the articles scanned are placed on the security scale. Security application programs operating within terminal 34 monitor security scale 48 to determine whether articles not scanned have been added to the security scale area. An anomalous condition that requires investigation may be signaled by lighting a warning or alert light color within the tri-color indicator mounted at the terminal end of indicator pole 52 of checkstand 18. A security camera 56 may be mounted onto indicator pole 52 for generating video data corresponding to the checkstand area. A database, disk drive, or other computer peripheral required for station operation may be housed within peripheral tray 60 located within checkstand 18. Checkstand 18 also includes upper currency module 40 for receiving currency and coins from a consumer as payment for a transaction. Module 40 also includes a coin dispenser 36 that returns the coin portion of the consumer's change while lower currency module 42 returns the bill portion of the consumer's change. Module 40 may also include a cash recycling unit (not shown) to provide cash received from consumers in the change dispensed to consumers.

As shown in FIG. 1, a consumer may place articles on feeder belt 20 and belt 20 is driven to bring articles to the end of belt 20 where a shut-off mechanism stops belt 20. The consumer may then remove articles from belt 20 and move them, one at a time, over scanner/scale 26 for article product data retrieval and/or weighing. Alternatively, the consumer may pull a cart containing articles for purchase so it is adjacent feeder unit 22 and place articles from the cart onto scanner/scale 26. The scanned articles may then be placed in bags on security scale 48. Once all of the articles are scanned, a consumer may provide payment through payment terminal 38 or currency module 40, receive change from module 44, and a receipt from printer 44. The consumer may then remove the bags from security scale 48 and leave station 10. The operation of checkout station 10 is controlled by a processor that is typically incorporated within terminal 34.

Figure 2:
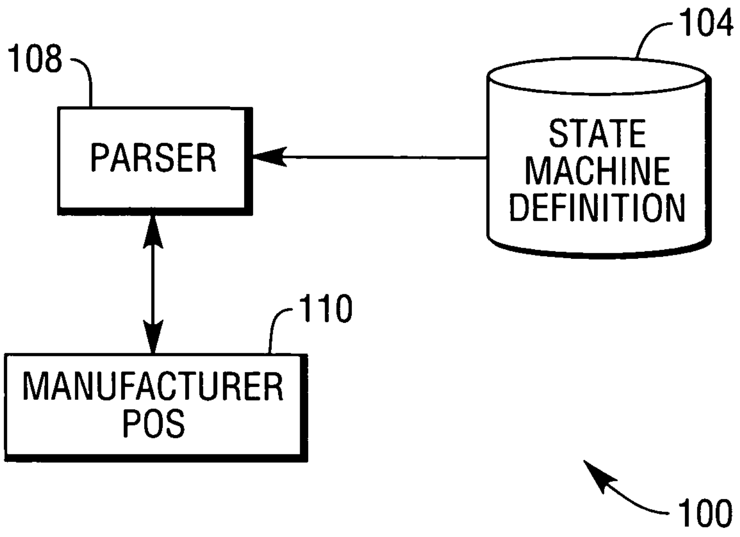
FIG. 2 is a block diagram of a system that uses a specification language interpreter to implement business logic for the system.

A block diagram of the system that may be used to operate a state machine implementation of a business logic system is shown in FIG. 2. The system 100 includes a state machine definition 104, which may be stored on a hard drive, a parser 108 for extracting specification language statements from the state machine definition 104 and interpreting the extracted specification language statements, and a business logic application program 110 comprised of business logic modules. The business logic modules include executable compiled program statements, which may be denoted as actions as described more fully below. The parser calls the business logic modules of the business application program 110 to process messages extracted by the parser from the specification language statements of the state machine definition. The specification language statements are preferably contained within a specification language file. These statements define a state machine implementation of a business system.

In more detail, the specification language definition for a business system, such as the checkout station described more fully below, uses data link libraries (DLL) that are provided by the manufacturer of the point-of-sale (POS) system for the checkout station. The state machine implementation defined by the specification language statements uses the business logic modules that are contained in the DLLs to operate the checkout station. These modules are compiled, executable computer code developed by the manufacturer of the checkout station. These modules implement the operations of the system such as reading bar codes, accumulating and totaling sales transactions, weighing goods, processing payments, and issuing receipts. The business logic that organizes these functions into a checkout system is performed in accordance with the state machine implementation defined by the specification language statements. The state machine implementation may also be supplemented with other specification language documents and/or customized DLLs.

Once system initialization occurs, as described more fully below, the parser begins extracting specification language statements from the specification language file. The extracted specification language statements are interpreted by the parser. This interpretation includes identifying the specification language statements by their tags, as described more fully below, and invoking calls to business logic modules identified in the interpreted specification language statements. As described more fully below, these business logic modules may be implemented by programming language objects. The objects may contain methods and these methods are called by the parser to process data, such as messages, that have been extracted from the specification language statements. These objects are used to implement actions, which are the smallest units of business logic for operating the system. Thus, the specification language file provides the framework for defining the business logic required for operation of the checkout station and the modules or objects of the DLLs provide the executable computer code necessary for implementing the business logic. This structure facilitates modification of the checkout station operation as well as maintenance. Specifically, operation of the checkout station may be modified by changing only the specification language statements without having to recompile and install executable code in the computer.

An implementation of a checkout station is now described in more detail. In this implementation, generation of a state machine for controlling operation of the checkout station and the initialization of the state machine are described. Then details are provided regarding the structure of the specification language statements, including the organization of the specification language statements into expressions. These expressions may be interpreted by an expression interpreter, incorporated within the parser, for locating expression tags in the specification language statements and interpreting the specification language statements between corresponding tags in accordance with the located expression tags. A method invoker may also be incorporated in the parser for calling the business logic modules to process messages extracted from the specification language file. Details regarding the actions implemented for the checkout station are described. Additional features for debugging the state machine implementation, providing JAVA support for classes implementing actions, and for clustering state machine implementations to augment the business system operation are also described.

To operate a business system, an instance of a state machine is generated. To generate an instance of a state machine, a static factory method BuildStateMachine of the CStateMachineFactory object may be called with a list of parameters. The CStateMachineFactory object is a programming language object provided by the manufacturer of the business system platform, such as the checkout station. The parameters for the method call include a unique name for the state machine, a universal resource locator (URL) that contains the state machine definition, a library name, and directory path. The state machine definition is used to generate data values and rule sets for the state machine. The library name preferably contains the actual factory method that returns the instance of the state machine. The directory path contains all the files to be loaded by the factory in the generation of the state machine. The return of the BuildStateMachine method from the CStateMachineFactory object provides a fully functional state machine that requires initialization.

During the generation of the state machine, the factory object loads the instance of the state machine using an instance of a loader class, such as CSMLoader, or one of its derivatives. This class uses a SAX Parser implementation to parse the specification language into appropriate data structures, such as expressions. As discussed more fully below, the preferred specification language file is written in Extensible Markup Language (XML). The SAX Parser is used to parse the XML of the state machine definition file to operate the state machine. Individual tags are processed by an implementation of the content handler class, such as, CContentHandler. During the build, a map is generated that associates each tag with its corresponding handler class. This mapping is accomplished by using an XPath expression as the key. The XPath expression is built by concatenating the forward slash symbol "/" character with the tag name until a stop tag is detected. Thereafter, a tag name and its associated forward slash character are removed until the last stop tag is reached.

As the SAX Parser parses the specification language file, it validates the structure of the statements. The statement structure that may be encountered in an exemplary XML specification file is described in more detail below. Any errors detected during validation of the structure are reported in an error log. The handlers that generate the error messages contained in the error log detect (1) duplicate definitions of states, messages, actions, constants, timers, or variables, (2) undefined states, messages, actions, constants, timers, or variables, (3) invalid names of states, messages, actions, constants, timers, or variables; and (4) incompatible tag options.

The state machine implementation defined by the specification language file may include customized DLLs. The factory implementation of the state machine searches these DLLs for a number of entry points, each of which can optionally be provided. The factory object uses a default implementation for any entry point not defined by the DLL. These entry points may be "C" style entry points, as described below. These entry points provide support for (1) registering/un-registering supported Action names, (2) generating/destroying a State Machine instance, and (3) generating/destroying any required Plugin objects. Template methods may also be used for supporting the generation/destruction of Actions. The following entry points may be provided:

| Entry Point Name | Required | Function |
|---|---|---|
| RegisterAll | Yes | Returns the names of all supported actions |
| UnregisterAll | Yes | Releases any resources used by the RegisterAll entry point. |
| BuildStateMachineFactory | No | Constructs an instance of the Factory itself |
| ReleaseStateMachineFactory | No | Releases an instance of the Factory |
| BuildStateMachineLoader | No | Constructs an instance of CSMLoader for use by the factory |
| ReleaseStateMachineLoader | No | Releases an instance of the CSMLoader for the Factory. |
| BuildStateMachine | No | Constructs a concrete instance of IStateMachine. |
| ReleaseStateMachine | No | Releases an IStateMachine created by this DLL |
| BuildCluster | No | Constructs a concrete instance of CCluster. |
| ReleaseCluster | No | Releases an CCluster created by this DLL |
| GetPlugin | No | Constructs an IPlugin of the specified name |
| ReleasePlugin | No | Releases an IPlugin instance create by this DLL |
| CCreateable<T,IAction>:: NewInstance | Yes | Creates an instance of the T action |
| CCreateable<T,IAction>:: ReleaseInstance | Yes | Releases an instance of the T action |

The first entry point in the action registration/un-registration returns a list of names of all actions supported by this library. It is called once during initialization when the library is generated. The signature for the entry point is:

HRESULT_declspec(dllexport) RegisterAll(const_TCHAR***, HTRACE).

The first parameter of this call is the address of the pointer to an array of names. This array is returned by the call and must not be freed. The second parameter is the handle to the Trace object. When the State Machine is in the process of being destroyed, the names are released. In order to facilitate this, the State Machine calls the following entry point:

void_declspec(dllexport) UnregisterAll( ).

As can be seen, this entry point does not take any parameters and returns no value.

The first entry point in the state machine factory creation/destruction category returns a pointer to an instance of a CStateMachineFactory. It is called once during initialization by the CStateMachineFactory. The signature for the entry point is:

```
HRESULT ___declspec(dllexport) BuildStateMachineFactory(HTRACE
     hTrace, STATE_MACHINE_NAMESPACE::CStateMachineFactory
     **).
```

The method takes two parameters, namely, the handle to the Trace object, and the address of the returned pointer to the newly constructed factory state machine. If no errors occur during generation, then the entry point returns S_OK. Any other value is an error. The second entry point in this category is used to release the state machine factory during termination. Its signature is:

```
HRESULT ___declspec(dllexport) ReleaseStateMachineFactory
     (HTRACE hTrace,
     STATE_MACHINE_NAMESPACE::CStateMachineFactory *).
```

The method takes two parameters, namely, the handle to the Trace object, and the pointer to the state machine factory to be destructed. If no errors occur during destruction, then the entry point returns S_OK. Any other value is an error. If these optional methods are not declared, then a default instance of CStateMachineFactory is generated.

The first entry point in the State Machine Loader Creation/Destruction category returns a pointer to an instance of a CSMLoader. It is used by the CStateMachineFactory to build and initialize the requested state machine instance. The signature for the entry point is:

```
HRESULT ___declspec(dllexport) BuildStateMachineLoader(HTRACE
     hTrace, STATE_MACHINE_NAMESPACE::CSMLoader **).
```

The method takes two parameters, namely, the handle to the Trace object, and the address of the returned pointer to the newly constructed CSMLoader instance. If no errors occur during generation, then the entry point returns S_OK. Any other value is an error. The second entry point in this category is used to release the state machine loader during termination. Its signature is:

```
HRESULT ___declspec(dllexport) ReleaseStateMachineLoader
     (HTRACE hTrace,
     STATE_MACHINE_NAMESPACE::CSMLoader *).
```

The method takes two parameters, namely, the handle to the Trace object, and the pointer to the state machine loader to be destructed. If no errors occur during destruction, then the entry point returns S_OK. Any other value is an error. If these optional methods are not declared, then a default instance of CSMLoader is generated.

The first entry point in the State Machine Creation/Destruction category returns a pointer to an instance of a state machine. It is called once during initialization by the CStateMachineFactory. The signature for the entry point is:

```
HRESULT _declspec(dllexport)    BuildStateMachine(const _TCHAR *
HTRACE hTrace STATE_MACHINE_NAMESPACE::IStateMachine **).
```

The method takes three parameters, which are the URL of the XML file, the handle to the Trace object, and the address of the returned pointer to the newly constructed state machine. If no errors occur during generation, then the entry point returns S_OK. Any other value is an error. The second entry point in this category is used to release the state machine during termination. Its signature is:

```
HRESULT ___declspec(dllexport) ReleaseStateMachine (HTRACE
        hTrace, STATE_MACHINE_NAMESPACE::IStateMachine
        *).
```

The method takes two parameters, which are the handle to the Trace object, and the pointer to the state machine to be destructed. If no errors occur during destruction, then the entry point returns S_OK. Any other value is an error.

The first entry point in the Cluster Generation/Destruction category returns a pointer to an instance of a state machine that consists of two or more cooperating state machines. It is called once during initialization by the CStateMachineFactory. The signature for the entry point is: HRESULT_declspec (dllexport) BuildCluster(const_TCHAR * HTRACE hTrace, STATE_MACHINE_NAMESPACE::CCluster **).

The method takes three parameters: the URL to the XML file, the handle to the Trace object, and the address of the returned pointer to the newly constructed state machine cluster. If no errors occur during construction, then the entry point returns S_OK. Any other value is an error. The second entry point in this category is used to release the state machine during termination. Its signature is: HRESULT_declspec (dllexport) ReleaseCluster (HTRACE hTrace, STATE_MACHINE_NAMESPACE:: CCluster *); The method takes two parameters: the handle to the Trace object, and the pointer to the state machine cluster to be destructed. If no errors occur during destruction, then the entry point returns S_OK. Any other value is an error.

The first entry point in the Plugin Creation/Destruction category returns a pointer to an instance of a factory object, which provides a mechanism for extending the state machine definition language with new tags. It is called once during initialization by the CStateMachineFactory. The signature for the entry point is: HRESULT_declspec(dllexport) GetPlugin (const_TCHAR *, IPlugin **, HTRACE). The method takes three parameters: the symbolic name of the plugin, the address of the returned pointer to the newly constructed IPlugin object, and the handle to the Trace object. If no errors occur during construction, then the entry point returns S_OK. Any other value is an error. The second entry point in this category is used to release the plugin object during termination. Its signature is: HRESULT_declspec(dllexport) ReleasePlugin (IPlugin *, HTRACE). The method takes two parameters: the pointer to the IPlugin to be destructed, and the handle to the Trace object. If no errors occur during destruction, then the entry point returns S_OK. Any other value is an error.

There are two Action Factory Method entry points for each action exposed in the DLL. Both entry points in this category should be generated by registration macros included in the same file as the action itself. For example, in the State Machine there is an action called CSendMsg. At the bottom of the sendmsg.cpp file, resides the following code: REGISTER_SM_ACTION(SendMsg). The macro REGISTER_SM_ACTION itself has been defined within the file ActionBase.h as:

```
#define SM_REGISTRATION_PREFIXSM.
#define REGISTER_SM_ACTION(NAME)\
DECLARE_CLASS_CREATION_DESTRUCTION(NAME)\
DECLARE_REGISTRATION_CLASS
(SM_REGISTRATION_PREFIX,NAME)\
DEFINE_REGISTRATION(NAME)
```

These macros automatically generate the required entry points for the actions and expose them to the CRegistrationManager. Each component user of the State Machine creates a unique registration macro and registration prefix and use that macro for all actions defined within the DLL.

The first entry point in this category returns a pointer to an instance of a newly created Action of type T. This entry point is a static template member function. It is called by the CXMLStateMachine factory to generate the Action. The signature for the entry point is:

IAction* CCreateable<T, IAction>::NewInstance( )

The second entry point in this category is used to release the action generated by the above entry point. Its signature is:

void CCreateable<T, IAction>::ReleaseInstance (IAction *)

The method takes as a parameter the address of the action to release.

Upon return of the BuildStateMachine method, initialization is completed by calling the Start method of the instance of the returned state machine. This method is called with a new worker thread parameter, which is used to run the state machine. All state machine actions are performed using this worker thread.

The state machine processes messages and executes rules. The message processing may be either asynchronous or synchronous. The message processing and rule set execution are performed by state machine elements. The message processing, rule set execution, and state machine elements to perform these tasks are now described in more detail.

The state machine operates by accepting Messages and executing rulesets in response. Execution of the StateMachine is coordinated by placing Messages in a CSynchronizedQueue using either the PostMsg method for asynchronous operation or the SendMsg method for synchronous operation. For asynchronous operation, the PostMsg does not wait for a return code. For synchronous operation, the SendMsg method waits until the last action is processed for that message and returns some return code set by the ruleset. The worker thread removes a Message from the CSynchronizedQueue and determines if there is a ruleset for that Message in the Global state. If a ruleset exists for the message, then that ruleset is executed first. This ruleset may not transition from the current state.

The worker thread then determines if there is a ruleset for that Message in the current state. If so, then it executes that ruleset. If not, then the worker thread determines if there is a ruleset for that Message in a special state called the "any" state, which is denoted in the XML definition by the state name "*". Any ruleset found in the any state is executed. If no ruleset has been found, the message is passed to a default handler method that may or may not handle the message. The default handler for a basic state machine simply logs an entry stating that the message was ignored. The default handler for a state machine cluster passes the message on to any other state machine in the cluster capable of handling the message.

A ruleset consists of zero or more IActions and zero or more transitions to other states. IActions are state machine elements discussed in more detail below. If IActions are present, then they are executed in sequence until one of the following happens: the IAction returns false, the IAction causes an exception to be thrown (failure), or there are no more IActions in the sequence. In the event the IAction returns false, the ruleset may specify a false action to be performed. It may also specify a transition to another state. In the event an exception is thrown, the state machine catches the exception, logs it, executes any optional failure action specified by the ruleset, and optionally transitions to a failure state specified by the ruleset. When no more IActions are in the sequence, the ruleset may optionally specify a transition to a new state.

Asynchronous message handling is the normal mode of operation of the state machine. Messages are made asynchronous by calling the PostMsg method. The return from PostMsg is immediate. At some time in the future, the message just posted is processed.

Synchronous message handling is also provided, but is used in a limited fashion because of the potential for deadlock. Any action that generates a Message can potentially cause a deadlock. Messages are made synchronous by calling the sendmsg method. When a synchronous message is added to the queue, the calling thread enters a wait state. The state machine signals the waiting thread when all actions have been executed for the given message.

All elements used by the state machine are represented externally (and internally by the CAbstractStateMachine) by a series of interfaces implemented as abstract base classes, each of which represents a different aspect of the state machine. In general, all external representations are read-only and do not provide any mechanism for modification. These elements are now discussed.

The IStateMachine interface represents the state machine itself. It provides a set of methods for accessing the various elements of the state machine in a read-only manner. All details of implementation are hidden from the user of this class. Unless otherwise provided, actions only have access to the state machine through this interface.

The IMessage interface provides a read-only representation of the input to the state machine used in the determination of the set of rules to execute. Each IMessage is uniquely identified by its name. The name provides the first key for the 2D map in the state machine. IMessage names may contain any character except those used by the XML parser for delimiters. Invalid characters include '<', '>', and '&'.

The IState interface provides a read-only representation of the states in which the state machine may reside. Each IState is uniquely identified by its name. The name provides the second key for the 2D map in the state machine. IState names may contain any character except those used by the XML parser for delimiters. Invalid characters include '<', '>', and '&'.

The IAction interface represents the smallest unit of work, that is, business logic that can be performed in response to an input in the state machine. This representation is read-only. In general, the implementation of an IAction is small and does not encompass more than a single function. This restriction enables reuse of the IAction in other rule sets. In addition, the smaller the IAction, the easier it is to debug and maintain. Each IAction is represented by a name. This name is unique within a single ILibrary. IAction names may contain only alphanumeric characters.

To further differentiate actions and prevent name collisions, actions may reside in a namespace. In this case, the name consists of two parts, the namespace name and the action name, separated by a '.' character. For example the action named "StartTransaction" in namespace "tb" would be referenced as "tb.StartTransaction". More information on namespaces is provided below.

An ILibrary is a representation of a DLL. It provides facilities to manage a set of IActions to be used in the state machine. Each IAction is dynamically loaded and generated as needed from the DLL. It also can optionally provide a series of entry points used to customize the behavior of the state machine, as described above.

The IConstant interface is a read-only representation of a constant value that may be used in the StateMachine. It may be used in expressions or assignments to an IVariable. Each IConstant is uniquely identified by its name. IConstant names may contain both alphanumeric characters and the '_' character. Definitions for constants are described more fully below.

The StateMachine implementation allows the generation of variables to be used as needed. The IVariable interface represents these variables. Unlike most of the other elements, the IVariable is not read-only and allows its value to be changed. Each IVariable is uniquely identified by its name. IVariable names may contain both alphanumeric characters and the '_' character. Definitions for variables are described more fully below.

The StateMachine implementation supports the generation of timers that either repeat periodically or only expire a single time. Each time any timer expires, it generates a timeout message to be processed by the state machine. The ITimer interface represents these timers. Each ITimer is uniquely identified by its name. ITimer names may contain both alphanumeric characters and the '_' character. Note that definition of a timer also implies generation of a corresponding timeout message. This message is assigned a name that contains the string "_timeout" appended to the timer name. Definitions of timers are described more fully below.

The StateMachine implementation allows the specification of keyed tables. Each entry in the table has an associated key. Each key refers to a single value. Keys and values may be either string data or integer data. Each ILookupTable is uniquely identified by its name. ILookupTable names may contain both alphanumeric characters and the '_' character. Definitions of lookup tables are described more fully below.

The StateMachine implementation uses expressions in a number of ways. Each expression is represented by an instance of the IExpression interface, which is obtained from the GetExpression factory method of the IStateMachine interface. Note that because of XML parsing limitations, expressions are represented with the following characters as XML entities:

| Character | XML Entity |
|---|---|
| '<' | < |
| '>' | > |
| '&' | & |

The StateMachine implementation allows the use of extension tags in the XML. These tags are handled via an instance of IPlugin. The IPlugin interface provides the services required to handle tags not in use by the state machine itself. Each IPlugin is uniquely identified by its name. IPlugin names may contain both alphanumeric characters and the '_' character. More information on developing plugins to the state machine is discussed below.

The IProcedure interface represents a set of actions that may be executed. Each IProcedure is uniquely identified by its name. IProcedure names start with an alphabetic character and may contain both alphanumeric characters and the '_' character. More information on procedures in the state machine is discussed.

The ISynchTable interface is a mechanism for coordinating multiple events before a state transition. Each ISynchTable is uniquely identified by its name. ISynchTable names start with an alphabetic character and may contain both alphanumeric characters and the '_' character. More information on synchronizing events is discussed below.

Operation of the state machine requires two phases for termination of its execution. In the first phase, the execution thread for the state machine is stopped by calling the Stop Method of the state machine. This method does not return until the thread has completed and successfully terminated. The second phase of state machine termination is initiated by calling the ReleaseStateMachine static method of the CStateMachineFactory object. This static method accepts parameters that include a handle for the trace object and a pointer to the state machine instance to be released.

The structure of the preferred XML specification language file for a valid State Machine XML begins with the <state-machine> tag, as in the following:

```
<state-machine modal=false>
    ...
</state-machine>
```

The <state-machine> tag has an optional modal attribute. This attribute may be used to alter the behavior used to process unknown messages and is described more fully below. To disable the modal attribute, it is set to a false value. This attribute is not used under normal circumstances.

The remainder of the XML File is structured into sections, the first of which define the elements that are used in the rules that follow. All elements are defined prior to their usage in a rule. These elements include: Libraries, Timers, Constants, Variables, States, Messages, Actions, and Lookup Tables. Each element type is included in an associated list tag as shown in FIG. 3.

A library definition consists of the <library> tag followed by a name attribute identifying the name of the DLL. The name may be fully qualified. If not, then the normal search order for an executable module is used in finding the DLL. An optional <comment> tag may be included. An example library list is shown in FIG. 4.

A timer definition, as shown in FIG. 5, consists of the <timer> tag followed by a name attribute identifying the name of the timer. This name is also used to generate a Message to be used in the event of a timeout. An optional <comment> tag may be included.

A constant definition, as shown in FIG. 6, consists of the <constant> tag followed by a name attribute identifying the name of the constant and an optional type attribute identifying the type of the constant. If the type attribute is not specified, the type of the constant defaults to integer. The type attribute may have one of the values specified in the following table.

| Type Value | Constant Type |
|---|---|
| Int | Integer |
| Long | Long |
| String | character data |
| Bool | boolean - "true" or "false" |

A required <value> tag follows giving the value of the constant. An optional <comment> tag may be included.

A variable definition consists of the <variable> tag followed by a name attribute identifying the name of the variable and an optional type attribute identifying the type of the variable. If the type attribute is not specified, the type of the variable defaults to integer. The type attribute may have one of the values specified in the following table.

| Type Value | Variable Type |
|---|---|
| Int | integer |
| Long | long |
| String | character data |
| Bool | boolean - "true" or "false" |

Additionally, the initial, maximum, and minimum values may be defined for the variable as indicated in the following table.

| .Attribute | Meaning | Required |
|---|---|---|
| Name | The name of the variable being defined | Yes |
| Type | The type of the variable. | No |
| initial-value | The initial value to assign to this variable. | No |
| max-value | The maximum value that this variable can attain. This value is only valid for a numeric type. | No |
| min-value | The minimum value that this variable can attain. This value is only valid for a numeric type. | No |

The example in FIG. 7 shows the definition of a variable named my_variable, that has an implied type of integer, an initial value of 0, a minimum value of 0, and a maximum value of 100.

A state definition, as shown in FIG. 8, consists of the <state-definition> tag followed by a name attribute identifying the name of the state. An optional <comment> tag may be included. In addition, one and only one state must be identified as the initial state using the <initial/> tag. An optional <global> tag may also be specified, identifying the state as the global state to be examined for rules prior to the state specific rules. If a state has been marked as global, it may not also be marked as the initial state.

A message definition, as shown in FIG. 9, consists of the <msg> tag followed by a name attribute identifying the name of the message. Optionally the definition may contain any or all of the following tags:

| | |
|---|---|
| <comment> | Text identifying this variable. |
| <value> | An application defined value, currently not used by the StateMachine. |

An action definition, as shown in FIG. 10, consists of the <action> tag followed by a name attribute identifying the name of the action. An optional <comment> tag may be included. Parameters may be also be specified via the optional <parameter> tag. Multiple <parameter> tags may be specified. If only a single parameter string is required, then the parameter may be specified using a parameter attribute on the action tag.

A lookup table definition, as shown in FIG. 11, consists of the <lookup-table> tag followed by the following attributes:

| | |
|---|---|
| name attribute | Identifies the table. |
| key-type attribute | Specifies the type of the key, either int or string |
| value-type attribute | Specifies the type of the value, either int or string |

Following the <lookup-table> tag may be 0 or more <lookup-entry> tags. Each of these tags specifies a key attribute and a value attribute. A lookup using this table involves searching through the table for a matching key and returning the corresponding value.

Properties provide the ability to substitute one string for another in the values and attributes of tags. A property definition consists of the <property> tag followed by a name attribute identifying the name of the property and a value attribute identifying the value to be substituted. To use the property, enclose it within '%' characters. An example of a property definition is: <property name="SOMENAME" value="c:\file\path">.

Namespaces provide the ability to help prevent name collision with actions defined in different objects. Multiple actions may have the same name as long as they reside in different namespaces. For example, two different actions named StartTransaction may reside in a TB object and a RAP object. To distinguish between them, they reside in separate namespaces, tb and rap, respectively, and are referenced as tb.StartTransaction and rap.StartTransaction. Namespaces for the following example are defined prior to use by the following:

```
<state-machine>
  ...
  <namespace name="tb"/>
  <namespace name="rap"/>
  ...
</state-machine>
```

Rules referencing the StartTransation action would use the following syntax:

```
<rules>
  <state name="State-1">
    <message name="Message-1">
        <message-rule-list>
            <rule action-name="tb.StartTransaction"/>
            <rule action-name="rap.StartTransaction"/>
        </message-rule-list>
    </message>
...
  </state>
...
</rules>
```

A definition for rules begins by defining the valid states for this machine, as in the following example:

```
<rules>
  <state name="State-1"/>
...
  <state name="State-n"/>
</rules>
```

Each state tag has a set of valid messages that may be received within the state tag:

```
<rules>
  <state name="State-1">
      <message name="Message-1"/>
...
      <message name="Message-n"/>
  </state>
...
</rules>
```

Any message not included within the state is ignored by default if there is no handler for that message within the '*' state. The <state> tag may also include an optional timeout attribute specifying that an anonymous timer be started when the state is entered. If the timer timeouts before the state is left, it is handled by a <timeout-rule-list> handler defined within that state.

A set of rules (ruleset) is optionally defined for each message tag. If no rules are defined, then no actions are performed. A ruleset has the following format:

```
<rules>
  <state name="State-1">
    <message name="Message-1">
      <message-rule-list>
        <rule action-name=.../>
        <rule action-name=.../>
        ...
        <rule action-name=.../>
        <success-transition>...</ success-transition >
      </message-rule-list>
    </message>
...
  </state>
...
</rules>
```

The <success-transition> tag specifies the name of a state to which the state machine transitions if all of the actions in the ruleset return true when executed. If the <success-transition> tag is not specified, then no transition occurs.

A rule tag definition consists of the <rule> element. All other parts of the rule are optional. The optional parts of the rule include:

An Action to perform

An Action to perform if the above first Action returns false

An Action to perform if the above first Action throws an exception.

If any optional action above is not specified, the rule executes a CNullAction, which does nothing when the Execute( ) method is invoked.

The rule definition looks like:

```
<rules>
  <state>
    <state-name>State-1</state-name>
    <message>
```

-continued

```
            <message-name>Message-1</message-name>
            <message-rule-list>
               <rule action-name="...">
                  <on-failure-action>...</on-failure-action>
                  <on-exception-action>...</on-exception-action>
               </rule>
               <success-transition>...</ success-transition >
            </message-rule-list>
         </message>
   ...
      </state>
   ...
    </rules>
```

The action tag definition specifies the name of the action to use and may specify zero or more <parameter> tags to be used by the action. If the action needs only a single parameter, then it may be specified using the parameter attribute on the <action> or <rule> tags. An action tag format may have the form:

```
         <rules>
      <state>
            <state-name>State-1</state-name>
            <message>
               <message-name>Message-1</message-name>
               <message-rule-list>
                  <rule action-name="SomeAction">
                     <parameter value="SomeAction"/>
                     ...
                     <parameter value="SomeAction"/>
                     ...
                  </rule>
                  <success-transition>...</ success-transition >
               </message-rule-list>
            </message>
   ...
      </state>
   ...
    </rules>
```

A state may also have a set of entry and/or exit tag rules that are executed on entry to the state or on exit from the state. The only restriction on the ruleset is that it may not transition out of the state being entered/exited. The entry list tag may have the form:

```
            <rules>
         <state>
               <state-name>State-1</state-name>
      ...
               <entry-rule-list>
                  <rule action-name="SomeAction">
                     <parameter value="SomeAction"/>
                     ...
                     <parameter value="SomeAction"/>
                  </rule>
               </entry-rule-list>
               <exit-rule-list>
                  ...
               </exit-rule-list>
         </state>
      ...
         </rules>
```

Any state machine specification document may embed other state machine specification documents. For example, a State Machine XML document may embed other XML documents for processing together. The StateMachine provides the <include> tag to include the embedded document, the URL of which is specified by a name attribute. Documents may be embedded in the state machine specification file to provide a common set of actions, states, messages, as well as a set of customer specific set elements to override elements in a base file. For example, the following original file contains four embedded documents to be processed:

```
<state-machine>
   <include name="other-document-url.xml">
   <include name="other-document2-url.xml">
   <include name="other-document3-url.xml">
   <include name="other-document4-url.xml">
...
</state-machine>
```

The embedded file must have a top level <state-machine> tag. For example, other-document-url.xml, which is included in the previous example, must be a legal state machine XML document and must begin with a state-machine tag.

The State Machine provides a new procedure capability that allows a message handler to execute a group of common rules. A procedure is a collection of rules that can be called from any message handler. Once execution of this set of rules has finished, execution returns to in the original message handler.

A procedure tag is defined using the <procedure> tag as shown in the following example:

```
            <procedure name="Null">
         <procedure-rule-list>
               <rule action-name=...>
      ...
         <procedure-rule-list>
      </procedure>
```

A procedure may have zero or more argument tags defined using the <argument> tag, which has a required name attribute. Arguments may be referenced as variables anywhere within the procedure using the name on the name attribute. On return from the procedure, an argument's value is undefined. Arguments may be defined as follows:

```
      <procedure name="Null">
   <argument name="arg1" type="string" default-value="">
   <procedure-rule-list>
      <rule action-name=...>
...
   <procedure-rule-list>
</procedure>
```

| Attribute | Meaning | Required |
|---|---|---|
| Name | Name of this argument as referenced within the procedure | Yes |
| Type | Argument type. Valid values are the same as for variables. | No |
| default-value | Value used if the corresponding parameter is not specified on the <call>. | No |

Use the <return> tag to return execution to the caller. An example of a return tag is:

```
<procedure name="Null">
  <rule action-name=...>
...
  <return>
</procedure>
```

When the procedure returns, execution resumes with the next rule following the <call> rule.

A procedure is executed using the <call> tag as in the following example:

<call name="Null"/>

The name attribute is required and specifies the name of a previously defined procedure. A <call> rule may be placed anywhere where a <rule> tag may be placed.

The <call> tag for a procedure may also specify parameter tag values. These values are represented by the <parameter> tag as in the following example:

```
<call name="Null">
  <parameter type="string" value="Hello World!">
<call name="Null">
```

If a parameter is omitted, then it takes on any default-value specified by the corresponding <argument> tag. Parameters are positional, i.e., the first parameter is matched with the first argument specified; the second parameter is matched with the second argument; etc.

At times it is necessary to wait on multiple events to happen before transitioning from one state to another. Keeping track of all the events requires either multiple states waiting for each event or a series of flags set when a particular event is received. This idiom is so common that the state machine provides a special construct to keep track of multiple events. The ISynchTable object provides a table of expected events. As events are received, the ISynchTable keeps track of which are received. A series of internal actions provide the ability to manage and monitor the state of the ISynchTable. These are:

| | |
|---|---|
| reset | Resets the ISynchTable to a known state. |
| update | Updates the ISynchTable with the current event. |
| is_all_complete | Returns true if all events have been received. |
| is_any_complete | Returns true if any event in the list has been received. |
| is_complete | |

A SynchTable is defined using the <synch-table> tag as in the following example:

```
<synch-table name="STable1">
  <entry>Message 1</entry>
  <entry>Message 2</entry>
...
  <entry>Message n</entry>
</synch-table>
```

Certain tags use expressions in determination of the course of actions to be performed. These tags provide conditional logic and include <if>, <else-if>, <select>, and <while>. An expression consists of a left-hand side, an optional operator, and an optional right-hand side. The left and right hand sides can be a variable, constant, or a value. Supported operators are:

| Operator | Operator as valid XML | Supported Data Types | Usage |
|---|---|---|---|
| == | == | All | LH and RH are equal |
| != | != | All | LH and RH are not equal |
| > | > | int, long | LH is greater than RH |
| < | < | int, long | LH is less than RH |
| >= | >= | int, long | LH is greater than or equals to RH |
| <= | <= | int, long | LH is less than or equal to RH |
| ! | ! | int, long, bool | Returns the opposite of a Boolean expression. If the data type is int or long, it returns true if the value is not zero or false if the value is zero. |

If an expression consists solely of a left-hand side, then that expression evaluates true if the expression value is not zero or empty. Otherwise, the expression evaluates false. Additionally, any action that implements the interface IEvaluateable may be used as an expression. The Execute method of the action is called and a Boolean value is returned used as the result of the expression. The ! operator may be applied to any expression. This operator negates the result of evaluating the expression that follows it. An expression is defined using expression tags and the specification language statements provided between the tags. An exemplary group of expressions may include the logical constructs now presented.

The <if> tag evaluates the given expression and if true, then it executes the ruleset contained within it. An example of an if expression is shown in FIG. 12. The <else> tag can optionally follow an <if> tag. If the expression evaluates false, then the ruleset within the <else> tags is executed. The else definition is shown in FIG. 13. Also, the <else-if> tag can optionally follow an <if> tag. This tag contains an expression attribute. If the expression evaluates true, then the ruleset within the <else-if> tags is executed. The else-if definition is shown in FIG. 14.

The <select> tag allows execution of one of a series of rulesets based on evaluation of a series of expressions. The select definition is shown in FIG. 15. The <select> tag allows execution of one of a series of rulesets based on evaluation of a series of expressions supplied in enclosed <when> tags. The when definition is shown in FIG. 16. A default selection may be specified using the <otherwise> tag. If all previous expressions fail, then the ruleset specified in the <otherwise> tag is executed. The otherwise definition is shown in FIG. 17.

The <for> tag allows repeated execution of a set of actions. The for definition is shown in FIG. 18. The variable attribute in a "for" expression specifies the control variable to use for the control loop. Only an integer variable can be used for this purpose. The initial-value attribute specifies the initial value at which to start the control variable. The limit attribute specifies the maximum value for the control variable. When the control variable value exceeds this value, the looping terminates. The increment attribute specifies the increase of the control variable for each iteration of a loop. The <while> tag allows repeated execution of a set of actions. The while definition is shown in FIG. 19. As long as the expression attribute remains true, the actions are executed again.

The <timeout-rule-list> tag provides a convenient shortcut mechanism for defining handlers for the timeout message from a timer. An optional timer-name attribute is allowed to identify the timer by name. If this attribute is not specified, then the timer handled must correspond to one set by the state.

The timeout rule list resides at the same level as a <message> definition. An example of a timeout rule list is shown in FIG. 20.

The <break> tag provides a mechanism to cause a message handler to stop executing rules for the current message. It is valid anywhere a <rule> tag can reside. An example of break tag usage is shown in FIG. 21.

Figures 22, 23:
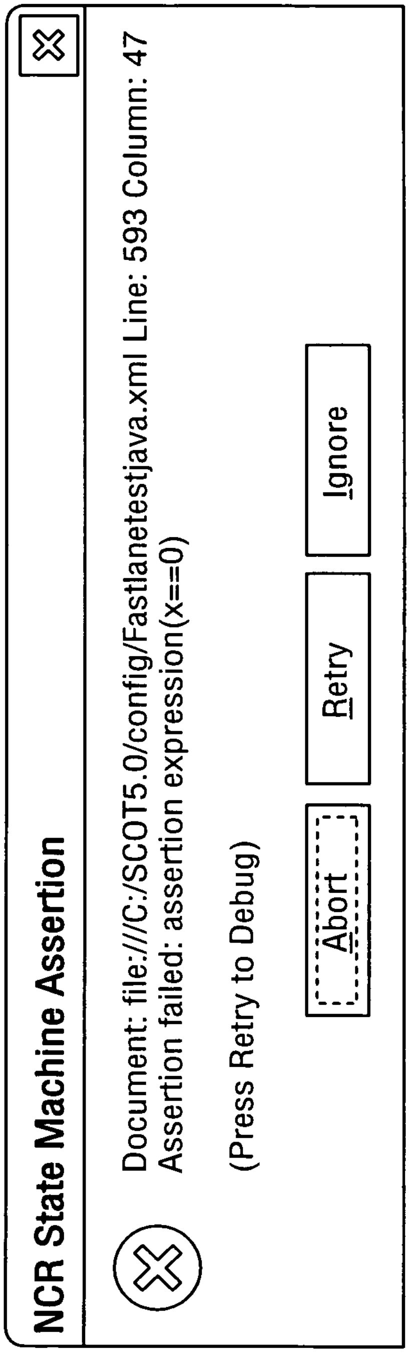
FIG. 22 is an example of a yield expression that may be used in the file structure of FIG. 3.
FIG. 23 is an example of an assertion dialog box that may be used in a state machine implementation.

The <yield> tag provides another mechanism to cause a message handler to stop executing rules for the current message. In addition, if the current state machine is a member of a cooperating cluster of state machines, which is described more fully below, then it passes focus on to some other state machine in the group. If it is not a member of a cooperating group, then it acts like the <break> tag. It is valid anywhere a <rule> tag can reside. An example of yield tag usage is shown in FIG. 22.

An assertion support, identified by the <assert> rule tag, specifies a condition that is expected to hold true at some particular point within the XML rules. If that condition does not hold true, the assertion fails. The actions performed in the event of an assertion failure depend on how the state machine was compiled. If the state machine was compiled in Release mode, the assertion throws an exception that is treated as a failure of the ruleset and a failure handler is executed. If the state machine was compiled in Debug mode, the execution of the state machine is interrupted, and the assertion dialog box, shown in FIG. 23 appears. The actions taken by pressing the buttons on the assertion dialog box are:

| Button | Function Performed |
|---|---|
| Abort | The application is terminated immediately. |
| Ignore | The application continues as if the assertion had not failed. |
| Retry | The application continues as if the assertion had not failed; however, the state machine debug dialog appears, allowing examination/modification of the state machine data model. Note: This action is only available with the Java support. It acts the same as Ignore if the Java support is not in use. |

A data model explorer may be provided with the state machine implementation to provide a mechanism for displaying data objects maintained by the state machine. Each object stored within a state machine has an associated set of metadata. This metadata contains:

| | |
|---|---|
| Object name | The xpath expression used to reference this object |
| Object value | A string representation of the value of the object |
| Creation Date | The date/time the object was created |
| Last Modification Date/Time | The last date/time the object was modified |
| Read Count | The number of times the object has been accessed |
| Write Count | The number of times the object has been modified |

Figure 24:
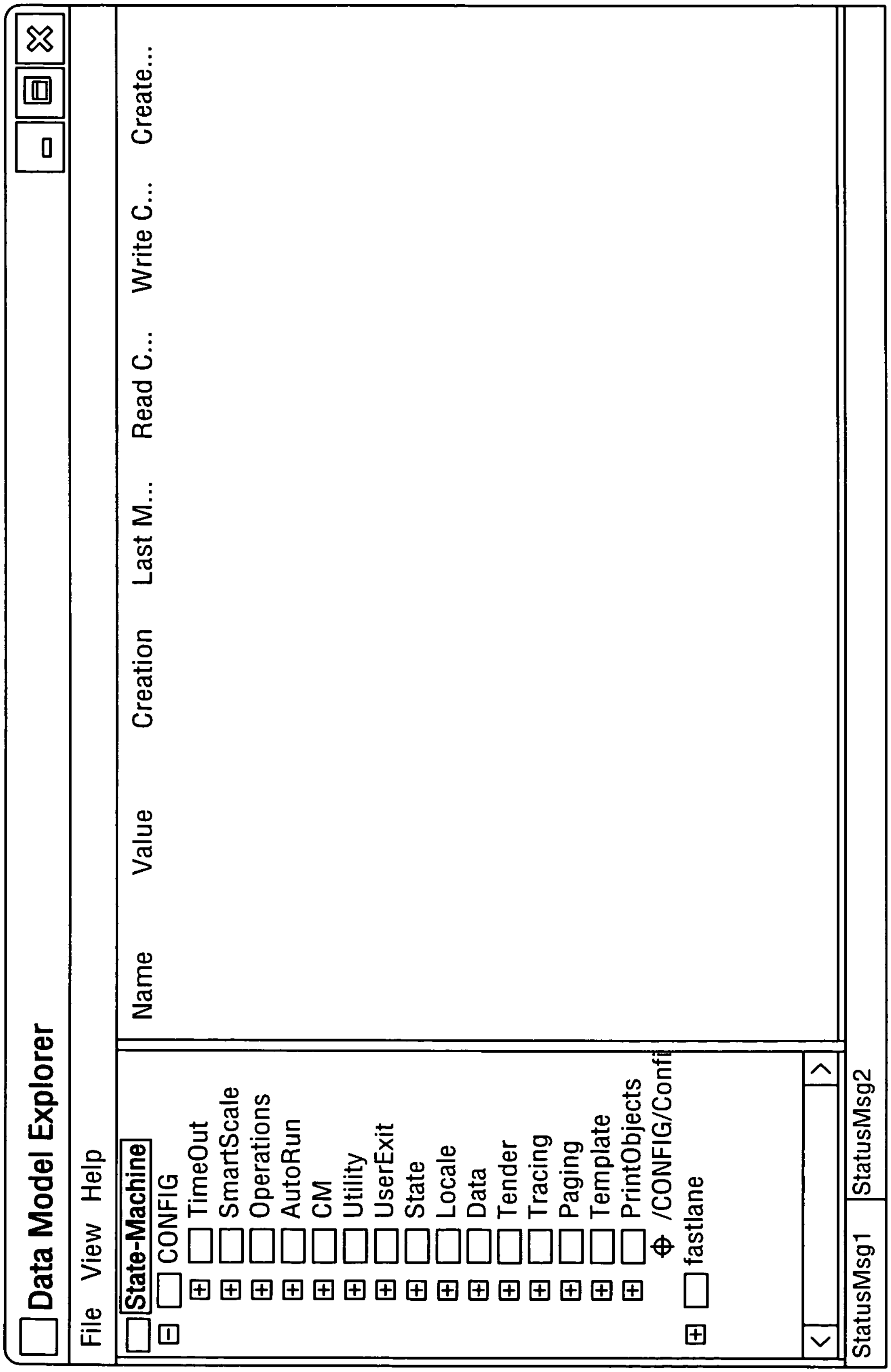
FIG. 24 is an example of a data model explorer that may be used in the file structure of FIG. 3.
Figure 25A:
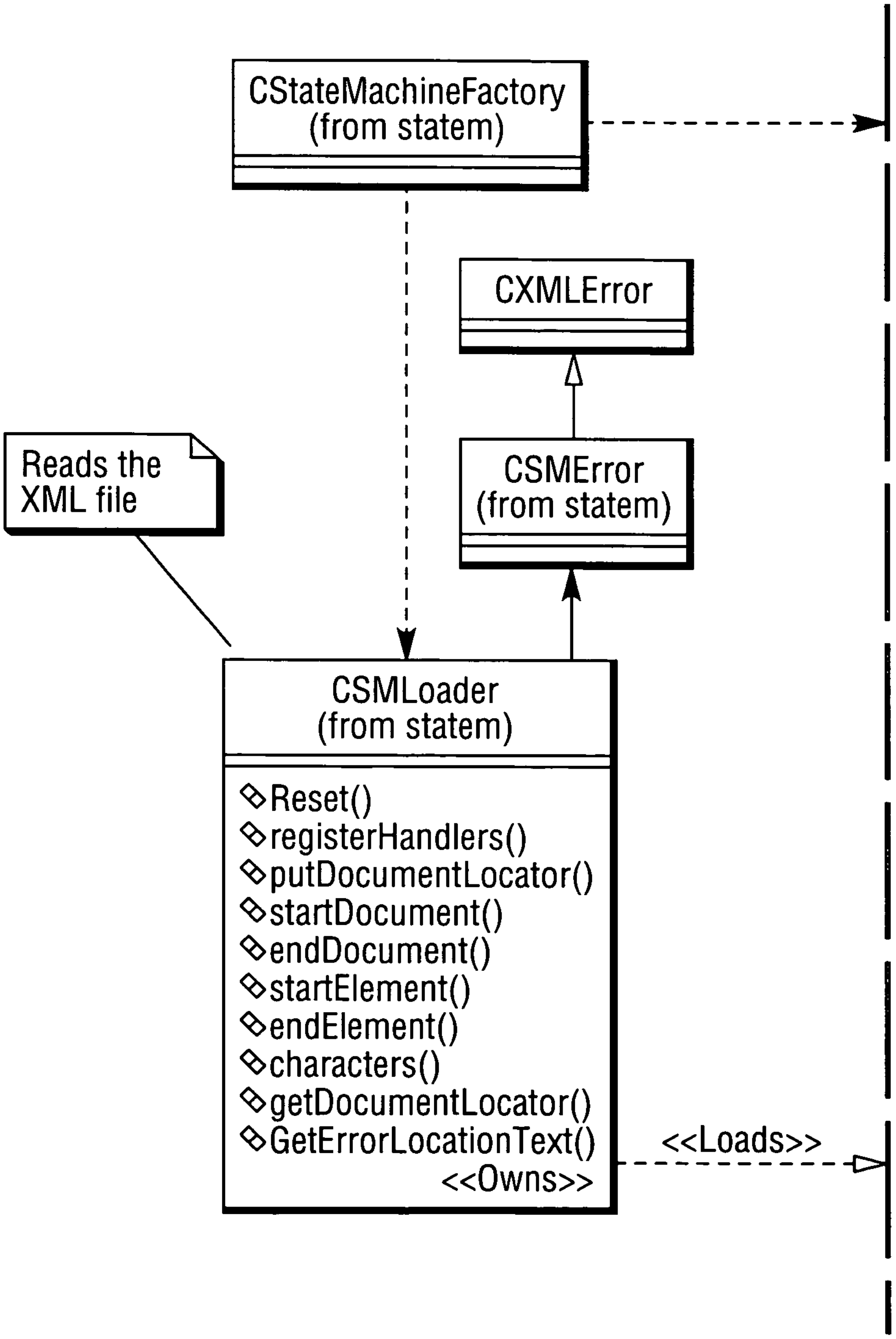
FIG. 25 is a class diagram of an exemplary set of non-transient classes used in a state machine implementation.
Figure 25B:
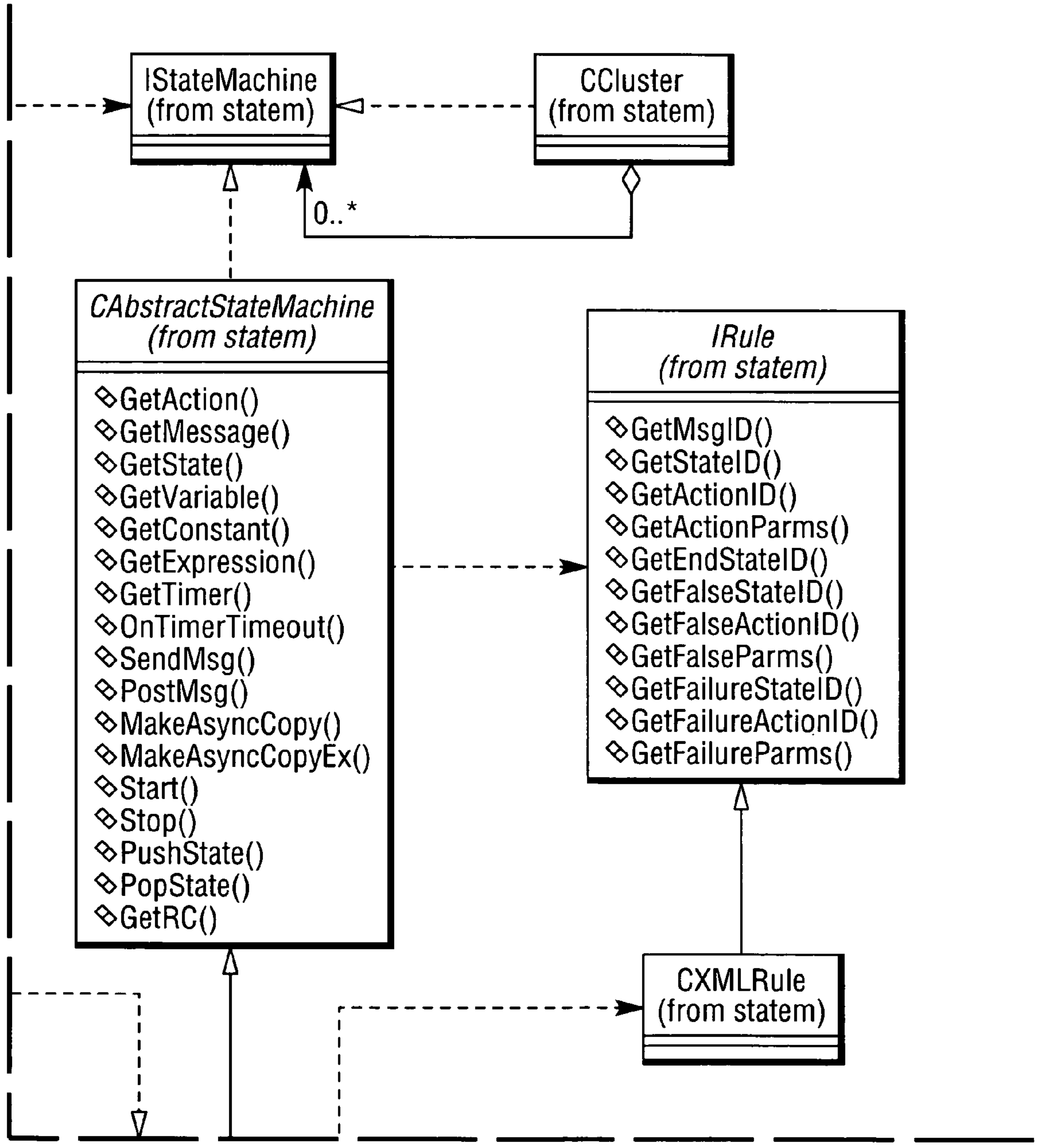
Figure 25C:
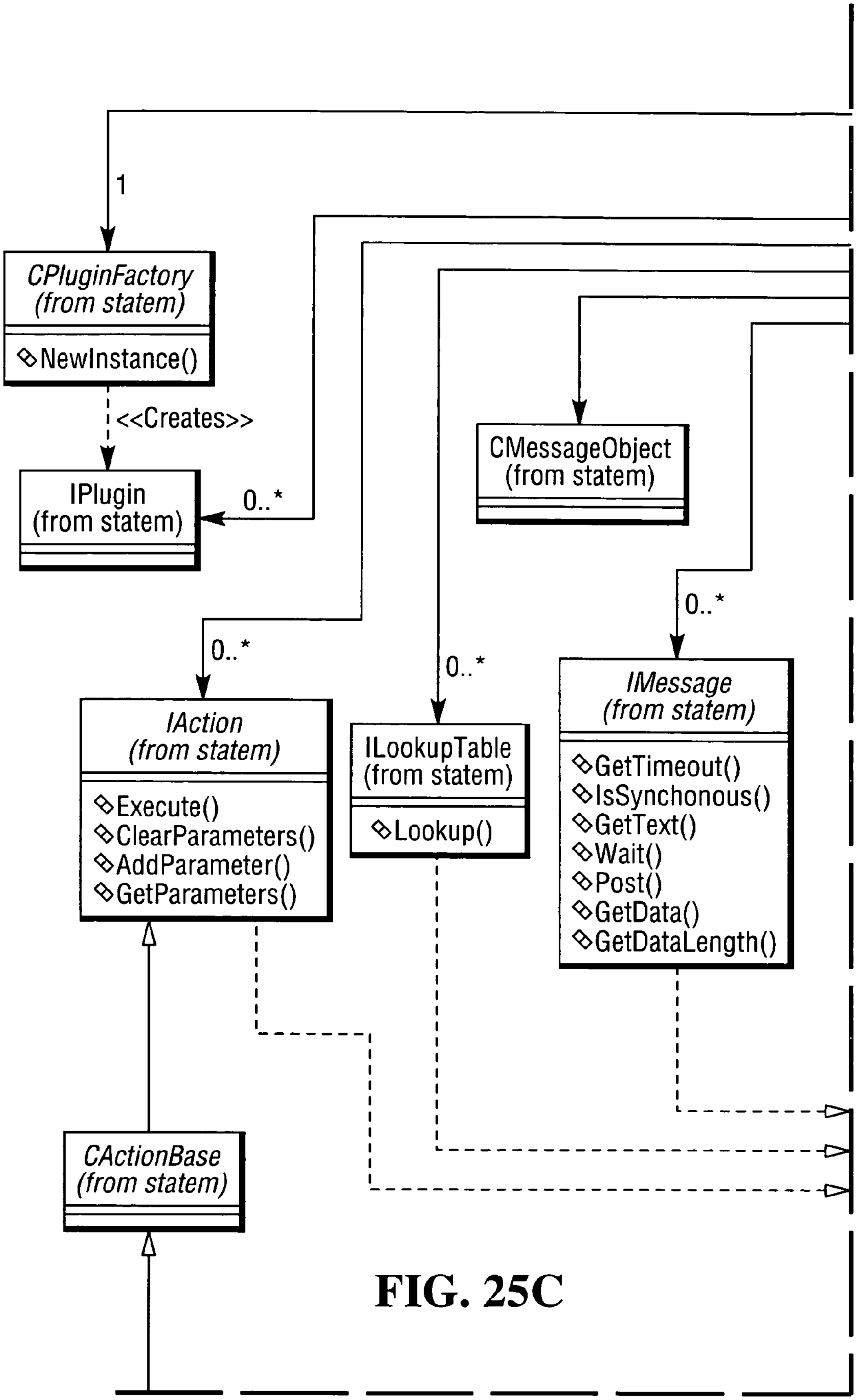
Figure 25D:
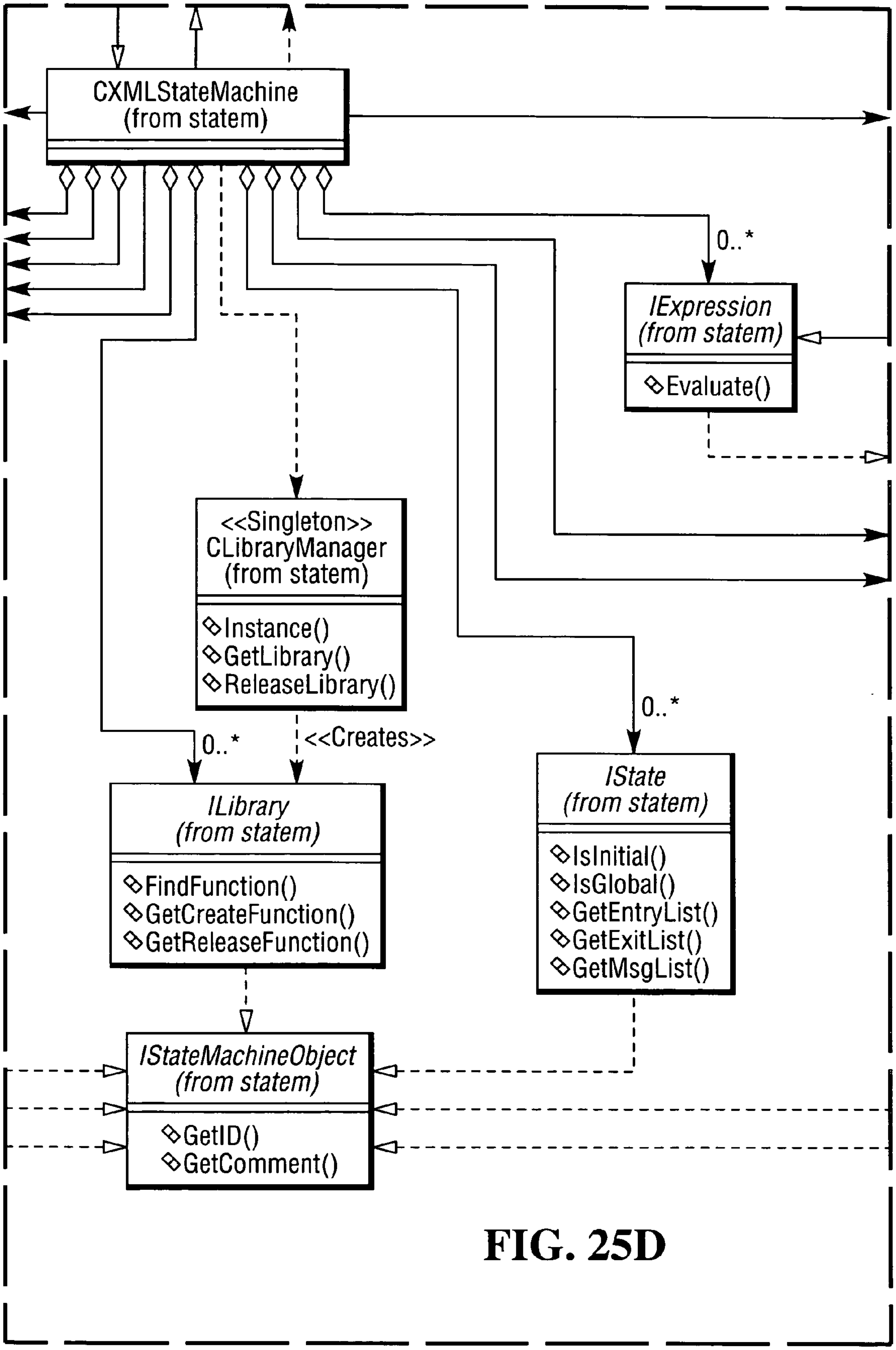
Figure 25E:
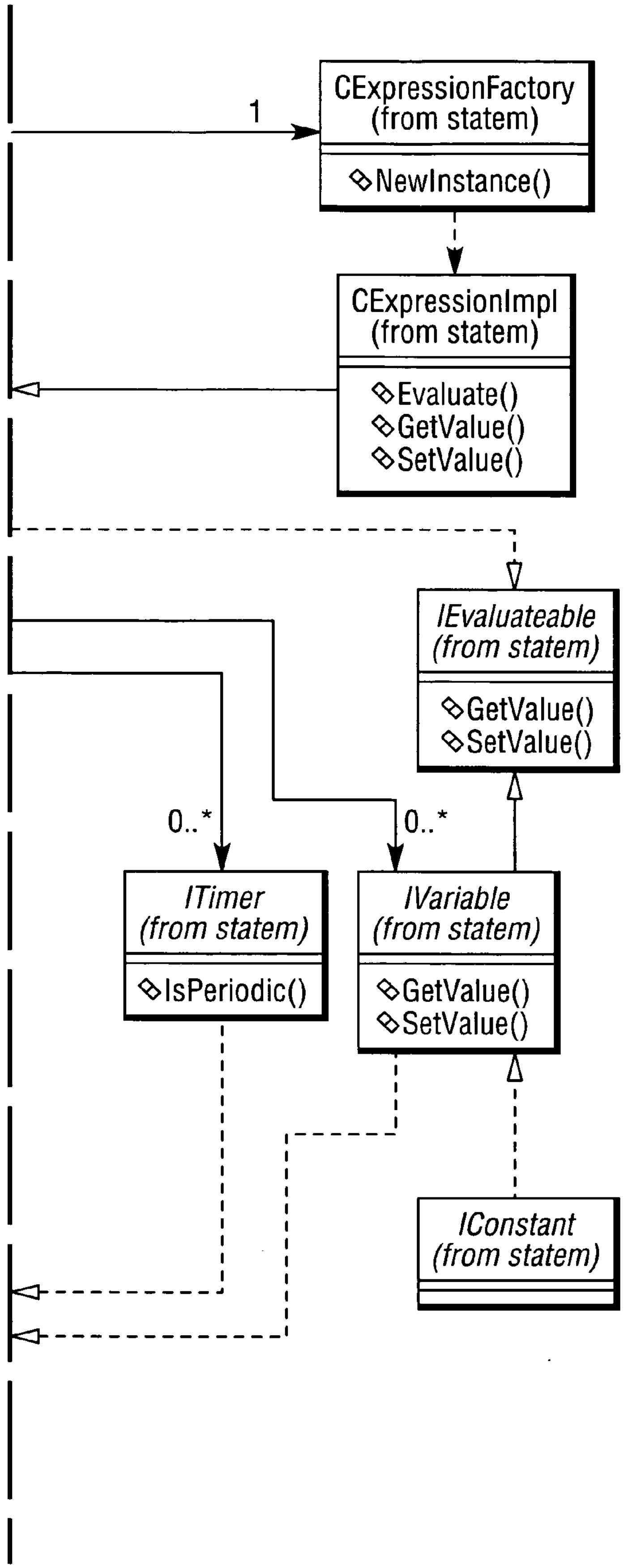
Figure 25F:
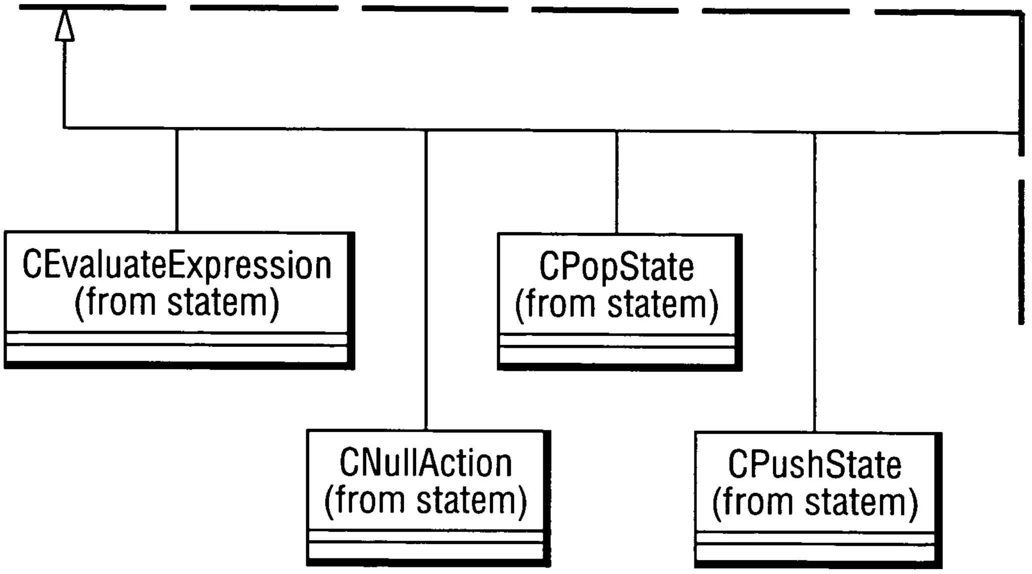
Figure 25G:
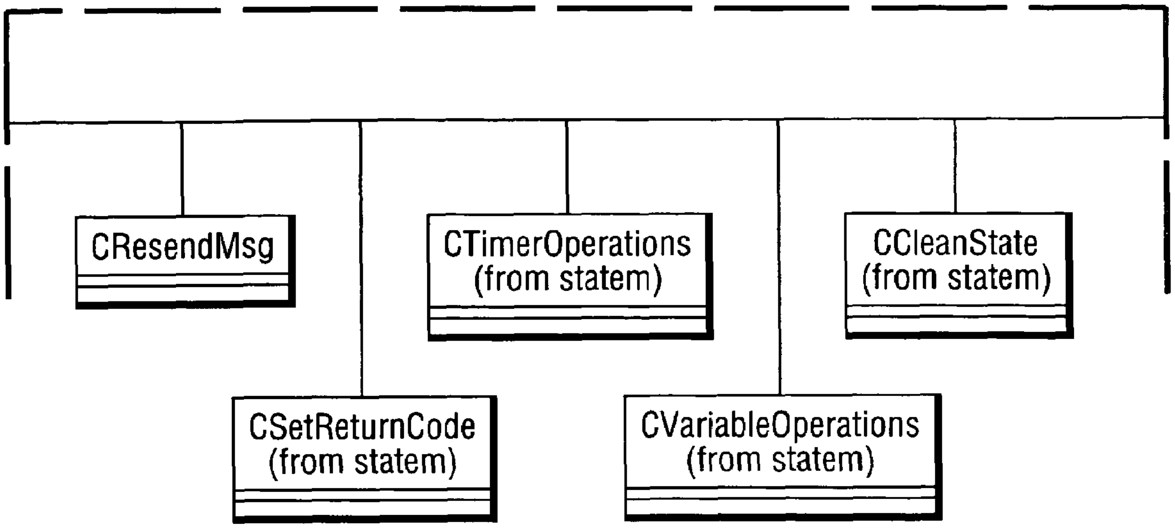

Currently, the data model explorer may only be used in conjunction with Java support. Java support is described more fully below. An example of the data model explorer window is shown in FIG. 24.

Environment variable text can be substituted into the values and attributes within the XML statements. As an example, suppose the following environment variable has been generated:

SCOT_BASE=c:\scot

This variable can be substituted by enclosing the variable name within '%' signs, as in the following example:

<tag attribute="% SCOT_BASE %\filename.txt">.

The resulting text is the equivalent of:

<tag attribute="c:\scot\filename.txt">.

Property values can be substituted into the values and attributes within the specification language statements. They are treated as environment variables. If a property and an environment variable share the same name, then the property value overrides the value set up by the environment variable. As an example, suppose the following property has been defined in a XML language statement with the following <property-list> statement:

<property name="SCOT_BASE" value="c:\scot">.

This value can be substituted by enclosing the property name within '%' signs, as in the following example:

<tag attribute="% SCOT_BASE %\filename.txt">.

The resulting text is the equivalent of:

<tag attribute="c:\scot\filename.txt">.

A number of actions are provided by the base state machine implementation. An exemplary list of built-in actions is shown below.

| Built-in Action Name | Purpose |
|---|---|
| assign-variable | Assign a value to a variable |
| clean-state | Removes all states push onto the stack |
| Decrement-variable | Decrement a variable value |
| delete-object | Deletes an object |
| Evaluate-expression | Evaluates an expression. This action has been deprecated. Use the <if> tag instead. |
| goto-state | Used to force the next state to the given state. This action should only be used in <if>, <else-if>, and <else> tags. |
| increment-variable | Increments the value of an integer variable |
| is_all_complete | Returns true if all events have been received by an ISynchTable instance |
| is_any_complete | Returns true if any event has been received by an ISynchTable instance |
| is_complete | Returns true if any requested event has been received by an ISynchTable instance |
| is_timer_timing | Returns true if the given timer is running. |
| log | Logs a trace line into the log. |
| log-event | Logs an event into the event log |
| match | Returns true if the string expression matches the regular expression |
| pop-state | Pops a state off the stack |
| push-state | Pushes a state onto the stack |
| resend-msg | Resends the current message |
| reset | Resets an ISynchTable instance |
| send-msg | Sends the given message to the state machine |
| set-return-code | Sets the return code for a synchronous message |
| start-timer | Starts the given timer |
| stop-timer | Stops the given timer |
| Update | Updates the list of received events in an ISynchTable instance |
| wait-timer | Waits for the given timer to timeout |
| Yield | Yields processing to another state machine in the cluster. If this is the only state machine, then acts as a noop. |

The assign-variable built-in action is used to assign a value to a named variable. It accepts the following parameters:

| Attribute Name | Usage |
|---|---|
| variable-name | Specifies the name of the variable to be assigned the value of the given expression |
| expression | The expression to evaluate and assign to the variable |

The clean-state built-in action is used to remove all states from the state machine stack. It has no parameters.

The decrement-variable built-in action is used to decrement the value of a named variable. It has the following parameters:

| Attribute Name | Usage |
|---|---|
| variable-name | Specifies the name of the variable to be assigned the value of the given expression |

The goto-state built-in action is used to force the state machine to transition to the given state. It has the following parameters:

| Attribute Name | Usage |
|---|---|
| state-name | Specifies the name of the new state, to which the state machine transitions. |

The increment-variable built-in action is used to increment the value of a named variable. It has the following parameters:

| Attribute Name | Usage |
|---|---|
| variable-name | Specifies the name of the variable to increment |

The is_all_complete built-in action returns true if all events in the ISynchTable instance have been received. It has the following parameters:

| Attribute Name | Usage |
|---|---|
| synch-name | Specifies the name of the synch table to check |

The is_any_complete built-in action returns true if any event in the ISynchTable instance has been received. It has the following parameters:

| Attribute Name | Usage |
|---|---|
| synch-name | Specifies the name of the synch table to check |

The is_complete built-in action returns true if all events specified in the parameter list have been received by the ISynchTable instance. It has the following parameters:

| Attribute Name | Usage |
|---|---|
| synch-name | Specifies the name of the synch table to check |
| Event | Specifies the event to check. May be specified as many times as required. |

The is_timer_timing built-in action is used in an expression to determine if a particular timer is currently timing. It has the following parameters:

| Attribute Name | Usage |
|---|---|
| timer-name | Specifies the name of the timer to test |

The log built-in action is used to add a line of output to the debugging log. It has the following parameters:

| Attribute Name | Usage |
|---|---|
| text | Specifies the text to be added to the log |

The log-event built-in action is used to add a line of output to the application event log. It has the following parameters:

| Attribute Name | Usage |
|---|---|
| source | Specifies the library name source |
| class | One of the following string values: basic, advanced, operational, checker, and external |
| type | One of the following string values: error, warning, information, audit-success, and audit-failure |
| category | Category of the desired message |
| id | Id number of the desired message |
| string | Optional: One or more substitution strings for the message |
| source | Specifies the library name source |
| class | One of the following string values: basic, advanced, operational, checker, and external |

The match built-in action is used to test a string against a given regular expression. It has the following parameters:

| Attribute Name | Usage |
|---|---|
| pattern | Specifies the regular expression pattern |
| expression | Specifies the string expression to which the regular expression is applied |

The pop-state built-in action is used to transition the state machine to a state that was previously saved on the stack. If the stack is empty, this action logs an error and terminates the execution chain. This action has no parameters.

The push-state built-in action is used to save the current state or some given state on the stack. It has the following parameters:

| Attribute Name | Usage |
|---|---|
| state-name | Specifies the name of the state to push. If omitted, then the current state is saved on the stack. |

The resend-msg built-in action is used by the state machine to resend the current message to itself. This action has no parameters.

The reset built-in action is used to reset an ISynchTable instance to a known state. It has the following parameters:

| Attribute Name | Usage |
|---|---|
| synch-name | Specifies the name of the ISynchTable instance to reset. |

The send-msg built-in action is used by the state machine to send a message to itself. It has the following parameters:

| Attribute Name | Usage | Required |
|---|---|---|
| message-name | Specifies the name of the message | Yes |
| Immediate | yes - Synchronous operation<br>no - Asynchronous operation (default) | No |
| copy-plist | yes - Copies the parameter list from the current msg<br>no - Has no parameters (default) | No |

The start-timer built-in action is used start a timer. It has the following parameters:

| Attribute Name | Usage |
|---|---|
| timer-name | Specifies the name of the timer to start |
| Duration | Length of time in milliseconds before the timeout occurs |
| Periodic | yes - The timeout reoccurs at the specified interval<br>no - This is a one-time occurrence (default) |

The start-timer built-in action is used stop a timer. If the given timer is not currently active, then the action fails. It has the following parameters:

| Attribute Name | Usage |
|---|---|
| timer-name | Specifies the name of the timer to stop |

The update built-in action is used to update an entry in the ISynchTable instance. By default, it uses the current message as the event. An event may optionally be specified. It has the following parameters:

| Attribute Name | Usage |
|---|---|
| synch-name | Specifies the name of the ISynchTable instance to reset. |
| Event | Specifies the name of the event to update |

The wait-timer built-in action is used to wait for a timer to timeout. If the given timer is not currently active, then the action fails. It has the following parameters:

| Attribute Name | Usage |
|---|---|
| timer-name | Specifies the name of the timer to wait on |

Note:
This action performs a hard wait on the main state machine thread. Use Because, this action does not allow any other message to be processed until the wait is complete, it is used sparingly.

The yield built-in action is used to relinquish control to some other state machine in the cluster. If no other state machine has been defined for this cluster, then the action just serves to stop the current chain of execution. This action has no parameters.

There are two different kinds of classes being defined within a state machine. The first is an abstract base class with no properties and all methods are defined as pure virtual. The first letter of the class name for these type classes is ‘I’, as in IClassName. The second kind of class is either a concrete implementation or an abstract base class that has properties and/or methods that are defined. The class names for these kinds of classes start with the letter ‘C’, as in CClassName. A list of exemplary class names and a brief description of each class is provided in the following table:

| Class Name | Responsibilities |
|---|---|
| | Main classes |
| CAbstractStateMachine | Given a Message in a particular state, determines a set of actions to perform |
| CExpressionFactory | Factory class used to create IExpression objects. |
| CMessageObject | Concrete implementation of a Message. |
| CPluginFactory | Factory object used to create instances of IPlugin |
| CSMLoader | Factory object used to read the XML file and build all content objects |
| CStateMachineFactory | Factory object used to construct an instance of IStateMachine. |
| CXMLRule | Concrete implementation of a Rule created by the XML State machine. |
| CXMLStateMachine | State machine implementation that reads its rules from an XML file |
| IAction | Abstract representation of an <action> defined in the XML. |
| IConstant | Abstract representation of a <constant> defined within the XML file |
| IEvaluatable | Interface providing a common set of functions for objects that can provide a value |
| IExpression | Interface representing an expression that can be evaluated |
| ILibrary | Represents an Action DLL, allowing IAction instances to be dynamically loaded. |
| ILookupTable | Represents a lookup table, providing the interface for looking up values based on some key |
| IMessage | Abstract representation of a <message> defined in the XML |
| IPlugin | Provides handlers for custom tags that CSMLoader does not know how to handle |
| IRule | Abstract representation of a set of instructions for a given message in a given state |
| IRuleProxy | Temporary abstract object containing a description of a rule set. Created by the SMLoader |
| IState | Abstract representation of a <state> defined in the XML |
| IStateMachine | External interface presented by this package. |
| IStateMachineObject | Abstract Base Class for objects that are defined within the XML file. |
| ITimer | Abstract representation of a <timer> defined in the XML |
| IVariable | Abstract representation of a <variable> defined in the XML |
| | Intrinsic State Machine Actions |
| CActionBase | Abstract Base Class for all concrete implementations of IAction. Provides a common set of functions for interaction with the state machine. |
| CCleanState | Cleans up the state stack. |
| CEvaluateExpression | Evaluates a given logical expression in the XML and returns true or false |
| CGotoState | Forces a state transition. Required for use in <if>, <else-if>, <else>, <when> and <otherwise> |
| CNullAction | Action that does nothing when the Execute( ) method is called |
| CPopState | Pops the state off the stack and restores it as the current state |

-continued

| Class Name | Responsibilities |
|---|---|
| CPushState | Pushes the current state onto the stack if no parameter is specified. Any parameter may specify the name of a state to push onto the stack. |
| CResendMsg | Resends the current message to the state machine |
| CSendMsg | Sends a new message to the state machine |
| CSetReturnCode | Sets the return code from the message to the given value. Used with a synchronous message |
| CTimerOperations | Provides the start and stop actions for ITimers |
| CVariableOperations | Provides the increment, decrement, and assign operations for IVariables |
| Concrete Implementations Used to Represent Entities Defined in the XML | |
| CActionImpl | Represents an <action> definition in the <constant-list> section of the XML. Used by the CXMLStateMachine. Created by the CSMLoader. |
| CConstantImpl | Represents a <constant> definition in the in the <constant-list> section of the XML. Used by the CXMLStateMachine. Created by the CSMLoader. |
| CExpressionImpl | Represents a logical expression XML defined in an action. Used by the CXMLStateMachine. Created by the CSMLoader. |
| CLibraryImpl | Represents a <library> definition in the <library-list> section of the XML. Used by the CXMLStateMachine. Created by the CSMLoader. |
| CLookupTableImpl | Represents a <lookup-table> definition. Used by the CXMLStateMachine. Created by the CSMLoader. |
| CMsgImpl | Represents a <message> definition in the <message-list> section of the XML. Used by the CXMLStateMachine. Created by the CSMLoader. |
| CRuleImpl | Represents a <rule> definition in the XML. Used by the CXMLStateMachine. Created by the CSMLoader. |
| CStateImpl | Represents a <state> definition in the <state-list> section of the XML. Used by the CXMLStateMachine. Created by the CSMLoader. |
| CStateObjectProxy | Represents a <state> definition in the <rules> section of the XML. Used by the CXMLStateMachine. Created by the CSMLoader. |
| CTimerImpl | Represents a <timer> definition in the <timer-list> section of the XML. Used by the CXMLStateMachine. Created by the CSMLoader. |
| CVariableImpl | Represents a <variable> definition in the <variable-list> section of the XML. Used by the CXMLStateMachine. Created by the CSMLoader. |
| Classes used During Load Process | |
| CActionHandler | Interprets an <action> definitions in the <action-list>. Used by the CSMLoader. |
| CConstantHandler | Interprets a <constant> definition in the <constant-list> sectionof the XML. Used by the CSMLoader. |
| CElseHandler | Interprets the <else> definition in the <rules> section of the XML. Used by the CSMLoader. |
| CElseIfHandler | Interprets the <else-if> definition in the <rules> section of the XML. Used by the CSMLoader. |
| CIfHandler | Interprets the <if> definition in the <rules> section of the XML. Used by the CSMLoader. |
| CLibraryHandler | Interprets a <library> definition in the <library-list> section of the XML. Used by the CSMLoader. |
| CLookupTableHandler | Interprets the <lookup-table> definition in the the XML. Used by the CSMLoader. |
| CMsgHandler | Interprets a <message> definition in the <message-list> section of the XML. Used by the CSMLoader. |
| COtherwiseHandler | Interprets the <otherwise> definition in the <rules> section of the XML. Used by the CSMLoader. |
| CPluginHandler | Interprets the <plugin> definition in the <plugin-list> section of the XML. Used by the CSMLoader. |
| CPropertyHandler | Interprets the <property> definition in the <properties> section of the XML. Used by the CSMLoader. |
| CRuleHandler | Interprets a <rule> definition in the XML. Used by the CSMLoader. |
| CRulesHandler | Interprets a <state> definition in the <rules> section of the XML. Used by the CSMLoader. |
| CSelectHandler | Interprets the <select> definition in the <rules> section of the XML. Used by the CSMLoader. |
| CStateHandler | Interprets a <state> definition in the <state-list> section of the XML. Used by the CSMLoader. |
| CTimerHandler | Interprets a <timer> definition in the <timer-list> section of the XML. Used by the CSMLoader. |
| CVariableHandler | Interprets a <variable> definition in the <variable-list> section of the XML. Used by the CSMLoader. |
| CWhenHandler | Interprets the <when> definition in the <rules> section of the XML. Used by the CSMLoader. |

A class diagram for the non-transient state machine classes is provided in FIG. 25. Each class contains the methods associated with the class. A class coupled to another class through a triangle in the figure represents an inheritance of the higher class. A class coupled to another class through a diamond in the figure represents a related class.

The following table contains a listing of XPath expression to tag mappings. These are used by the SMLoader to determine which CContentHandler class processes the current XML tag.

| Tag Name | XPath Expression |
|---|---|
| <state-machine> | /state-machine |
| | XPath expressions used by CSMLoader |
| <include> | //include |
| | XPath expressions used by CLibraryHandler |
| <library-list> | /state-machine/library-list |
| <library> | /state-machine/library-list/library |
| <library-name> | /state-machine/library-list/library/library-name |
| <comment> | /state-machine/library-list/library/comment |
| | XPath expressions used by CVariableHandler |
| <variable-list> | /state-machine/variable-list |
| <variable> | /state-machine/variable-list/variable |
| <var-name> | /state-machine/variable-list/variable/var-name |
| <comment> | /state-machine/variable-list/variable/comment |
| <initial-value> | /state-machine/variable-list/variable/initial-value |
| <max-value> | /state-machine/variable-list/variable/max-value |
| <min-value> | /state-machine/variable-list/variable/min-value |
| | XPath expressions used by CTimerHandler |
| <timer-list> | /state-machine/timer-list |
| <timer> | /state-machine/timer-list/timer |
| <timer-name> | /state-machine/timer-list/timer/timer-name |
| <comment> | /state-machine/timer-list/timer/comment |
| | XPath expressions used by CConstantHandler |
| <constant-list> | /state-machine/constant-list |
| <constant> | /state-machine/constant-list/constant |
| <constant-name> | /state-machine/constant-list/constant/constant-name |
| <comment> | /state-machine/constant-list/constant/comment |
| <constant-value> | /state-machine/constant-list/constant/constant-value |
| | XPath expressions used by CStateHandler |
| <state-list> | /state-machine/state-list |
| <state> | /state-machine/state-list/state-definition |
| <state-name> | /state-machine/state-list/state-definition/state-name |
| <comment> | /state-machine/state-list/state-definition/comment |
| | XPath expressions used by CMsgHandler |
| <msg-list> | /state-machine/msg-list |
| <msg> | /state-machine/msg-list/msg-definition |
| <msg-name> | /state-machine/msg-list/msg-definition/msg-name |
| <comment> | /state-machine/msg-list/msg-definition/comment |
| <value> | /state-machine/msg-list/msg-definition/msg-value |
| | XPath expressions used by CPropertyHandler |
| <property-list> | /state-machine/property-list |
| <property> | /state-machine/property-list/property |
| | XPath expressions used by CLookupTableHandler |
| <lookup-table> | /state-machine/lookup-table |
| <lookup-entry> | /state-machine/lookup-table/lookup-entry |
| | XPath expressions used by CActionHandler |
| <action-list> | /state-machine/action-list |
| <action> | /state-machine/action-list/action |
| <action-name> | /state-machine/action-list/action/action-name |
| <comment> | /state-machine/action-list/action/comment |
| | XPath expressions used by CRulesHandler |
| <rules-list> | /state-machine/rules |
| <state> | /state-machine/rules/state |
| <state-name> | /state-machine/rules/state/state-name |
| <global> | /state-machine/rules/state/global |
| <exit-rule-list> | /state-machine/rules/state/exit-rule-list |
| <entry-rule-list> | /state-machine/rules/state/entry-rule-list |
| <message> | /state-machine/rules/state/message |
| <message-name> | /state-machine/rules/state/message/message-name |
| <message-rule-list> | /state-machine/rules/state/message/message-rule-list |
| <success-transition> | /state-machine/rules/state/message/message-rule-list/success-transition |
| <failure-transition> | /state-machine/rules/state/message/message-rule-list/failure-transition |
| <on-failure-action> | /state-machine/rules/state/message/message-rule-list/on-failure-action |
| <exception-transition> | /state-machine/rules/state/message/message-rule-list/exception-transition |
| <on-exception-action> | /state-machine/rules/state/message/message-rule-list/on-exception-action |

-continued

| Tag Name | XPath Expression |
|---|---|
| | XPath expressions used by CRuleHandler |
| <rule> | //rule |
| <action> | //rule/action |
| <action-name> | //rule/action/action-name |
| <parameter> | //rule/action/parameter |
| <value> | //rule/action/parameter/value |
| <failure-transition> | //rule/failure-transition |
| <on-failure-action> | //rule/on-failure-action |
| <action-name> | //rule/on-failure-action/action-name |
| <parameter> | //rule/on-failure-action/parameter |
| <value> | //rule/on-failure-action/parameter/value |
| <exception-transition> | //rule/exception-transition |
| <on-exception-action> | //rule/on-exception-action |
| <action-name> | //rule/on-exception-action/action-name |
| <parameter> | //rule/on-exception-action/parameter |
| <value> | //rule/on-exception-action/parameter/value |

Figure 26A:
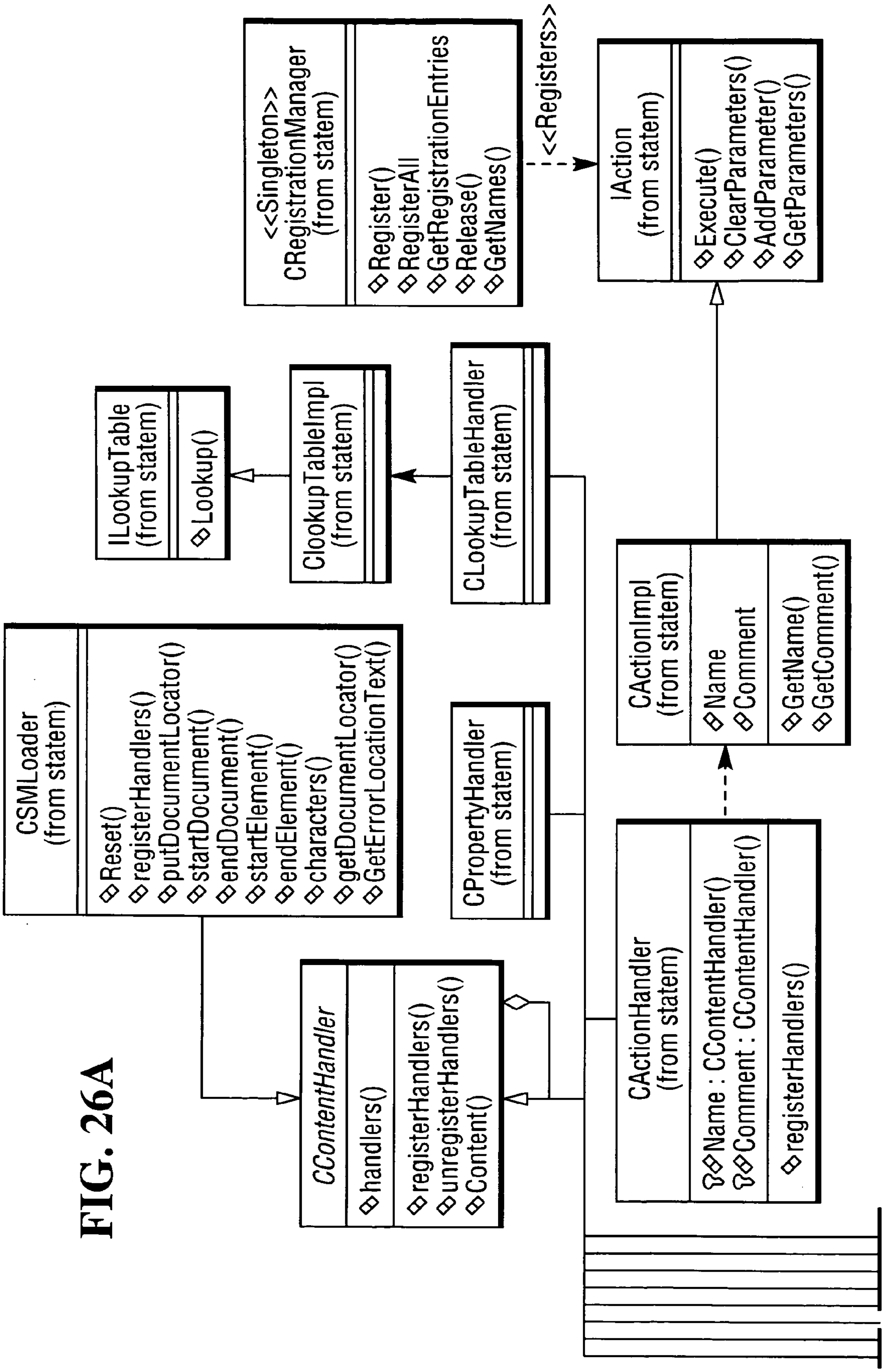
FIG. 26 is a class diagram of transient classes that may be used to parse the file structure of FIG. 3.
Figure 26B:
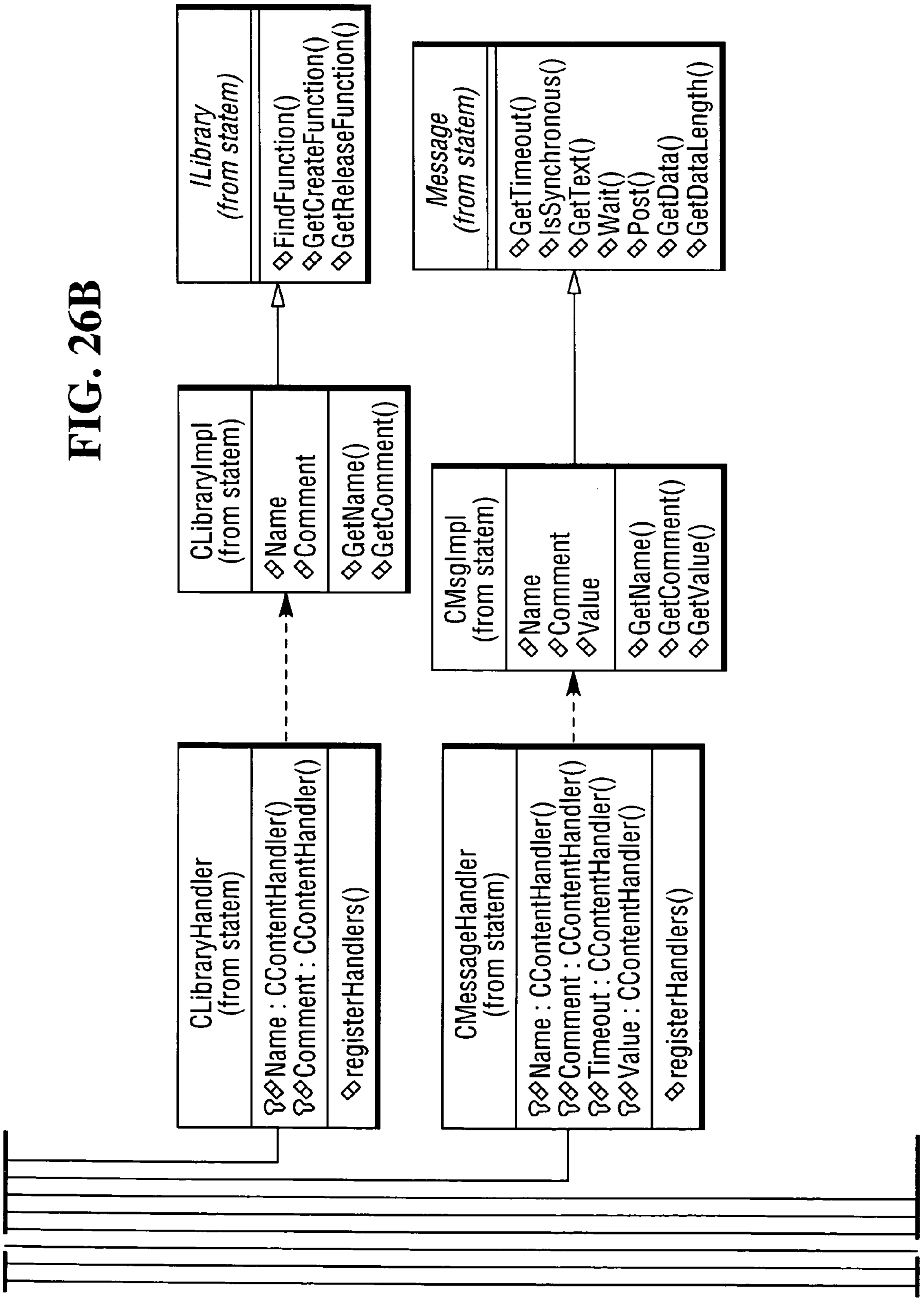
Figure 26C:
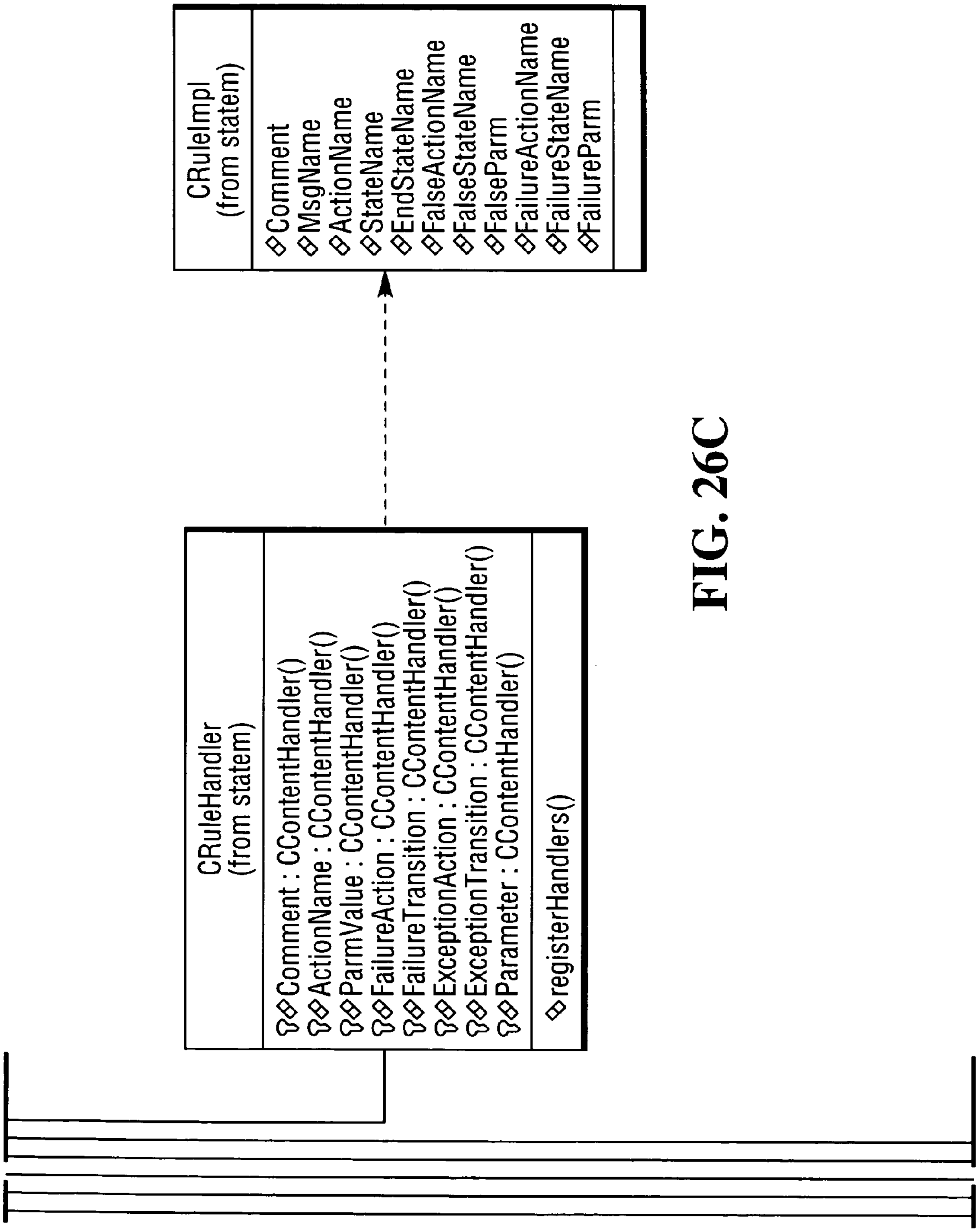
Figure 26D:
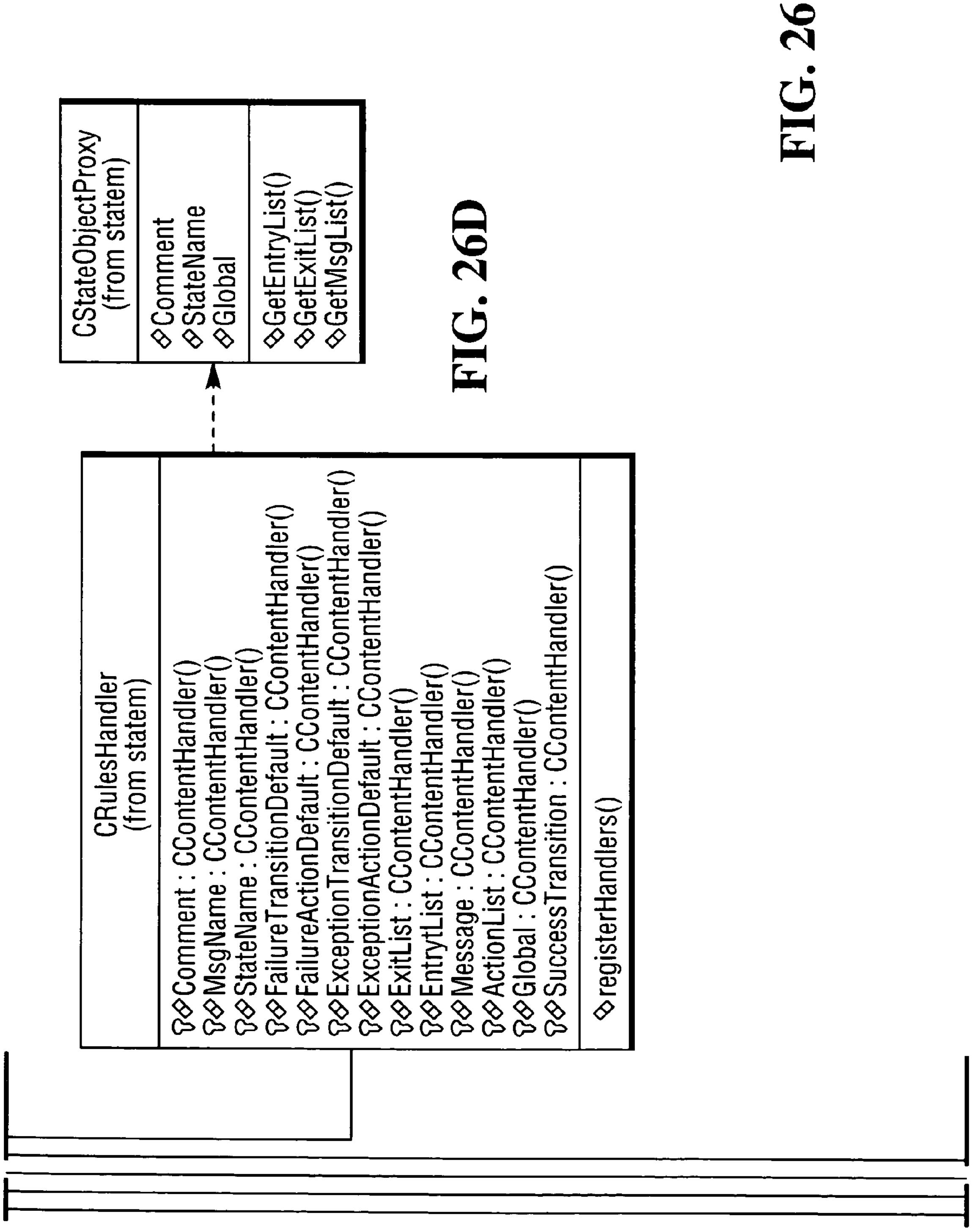
Figure 26:
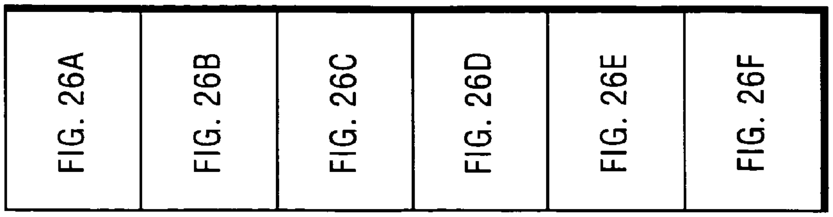
Figure 26E:
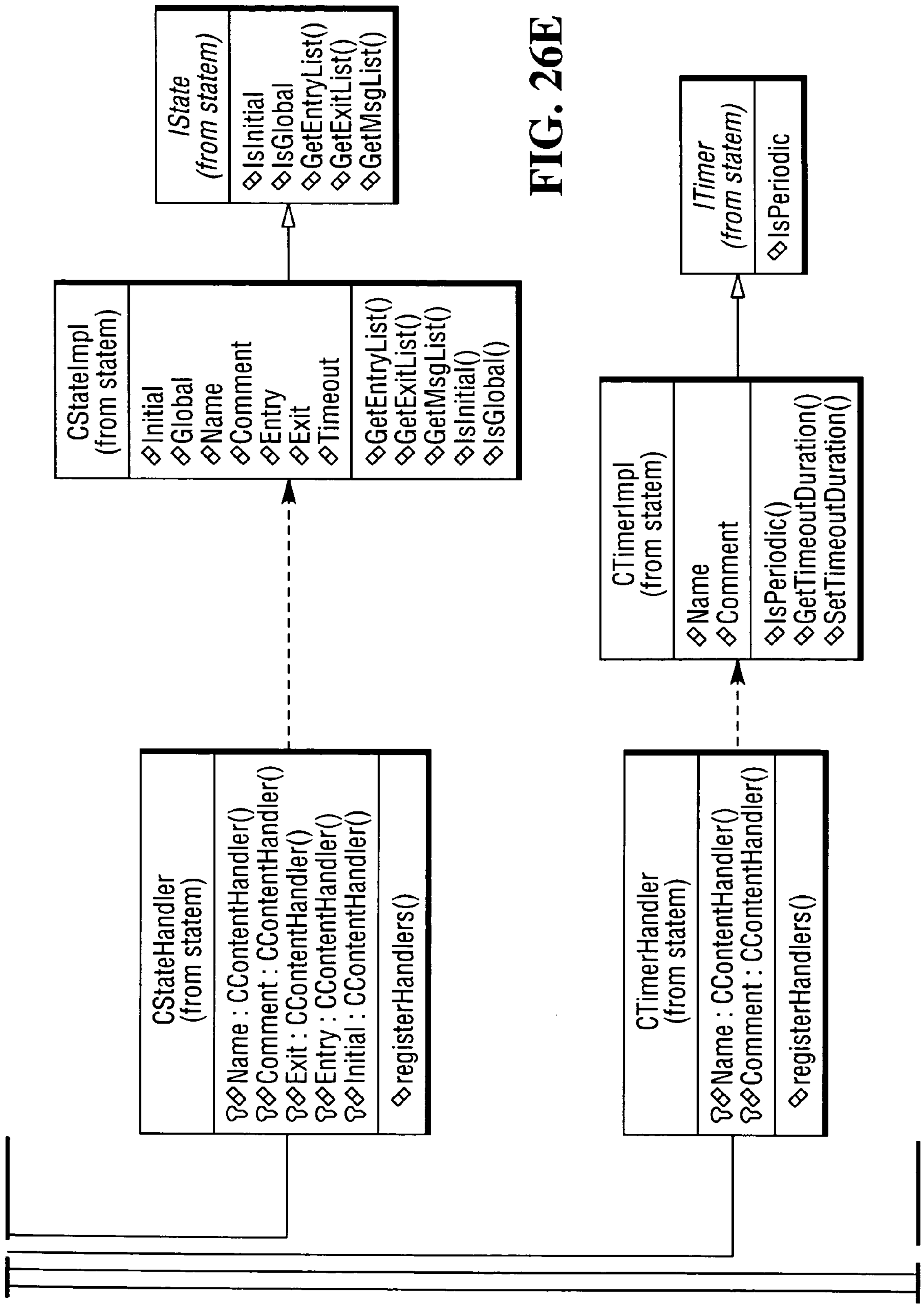
Figure 26F:
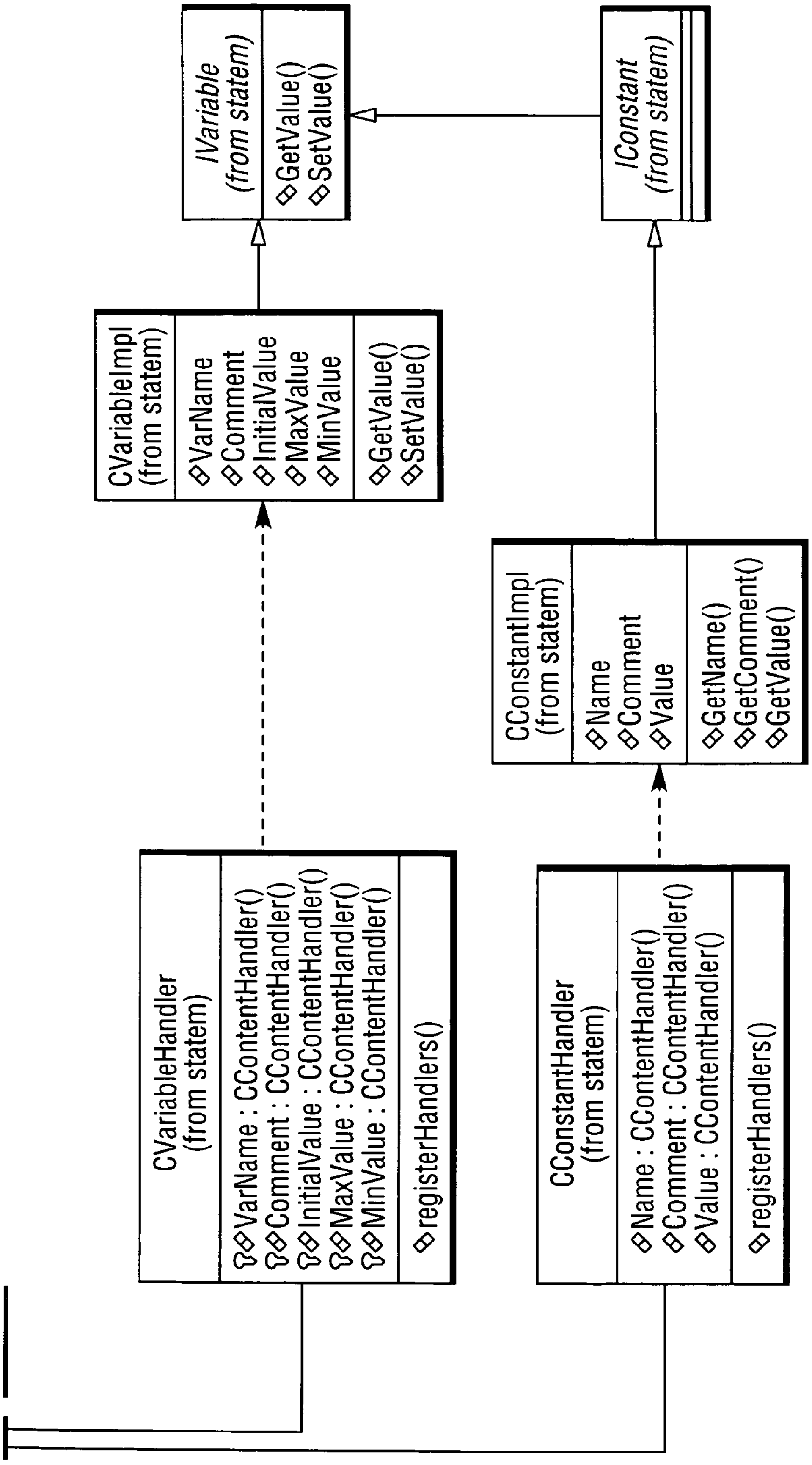
Figure 27:
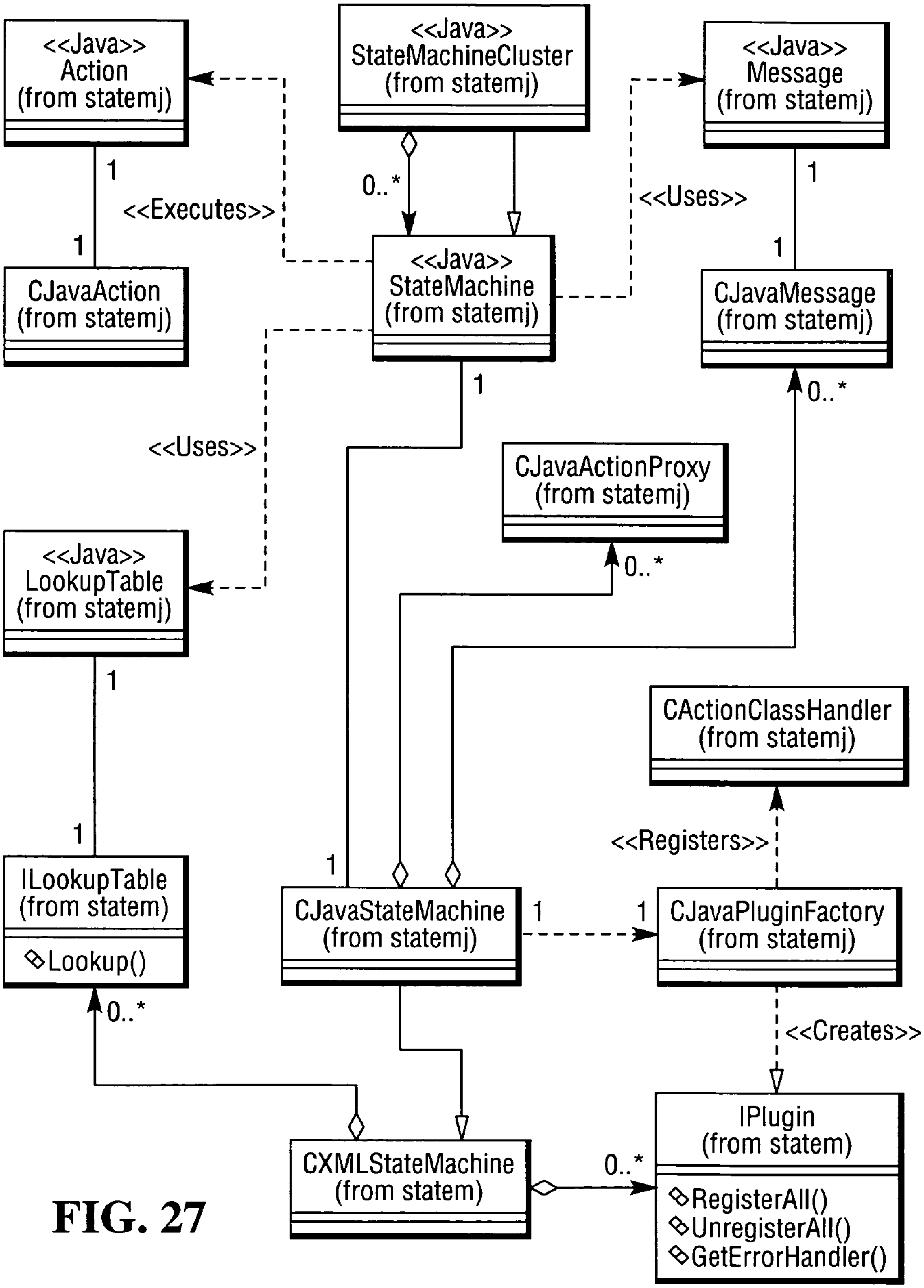
FIG. 27 is a class diagram of classes that may be used for Java support of the state machine implementation.

Most of the classes in the class diagram of FIG. 26 are used solely for the purpose of parsing the XML file and are released upon completion of the parsing. Those that are not transient are classes that are used by the StateMachine.

The latest version of the State Machine provides support for Java applications. The State Machine is represented by an instance of the class com.ncr.statem.StateMachine. This Java class interacts with an underlying C++ CJavaStateMachine object which allows Java actions to execute in conjunction with C++ actions. The Java support for the State Machine is provided as a separate executable DLL called statemj.dll. This DLL provides all the support classes for Java as well as the Java Native Interface (JNI) code supporting the Java actions. The Java support has been implemented as a plugin to the state machine. Consequently, the java plugin is added to the XML definition with the following statements:

```
<plugin-list>
  <plugin name="Java.Factory" />
</plugin-list>.
```

All instances of the class com.ncr.statem.StateMachine are generated via the com.ncr.statem.StateMachineFactory class. The create method returns a fully loaded StateMachine instance. It has the following signature:

```
public static StateMachine create(String_name
                    , String_url
                    , String_dllName
                    , String_configDir);
```

In this call statement, the _name parameter specifies the unique name of the state machine. The _url parameter specifies the URL containing the XML definition for this state machine. The _dllName parameter specifies the name of the shared dll containing the Java support. The _configDir parameter specifies the directory to use for URL relative searches.

Actions may be defined in Java and may coexist with actions defined in C++. As a matter of fact, all internal actions are C++ actions. Unlike C++ actions, Java actions are not registered prior to use. Instead, they are generated using Java reflection facilities. An instance of the named class is generated on demand the first time it is encountered and is maintained throughout the life of the state machine. Upon termination of the state machine, the Java action is destroyed. An example of a Java Action Definition is shown below. The addition of the <class> tag identifies this action as a Java action. The name attribute on the <class> tag specifies the fully qualified class name of the action.

```
<action-list>
  <action name="SomeAction">
    <class name="com.ncr.ActionName">
  </action>
</action-list>
```

Any field of a Java object stored in the shared data model described below can be accessed in an expression used by the state machine. These fields are accessed by calling an accessor method for the field. Only accessor methods of the form getXXX( ), where XXX is the name of the field to access, may be called. The object itself is referenced from the shared data model via its XPath name. The syntax to use in an expression is:

$(xpath-expression) [.method-nameo][[index]]

where

- xpath-expression is the XPath expression of the desired Java Object. Only simple absolute XPath expressions starting with the '/' character are supported.
- method-name is the accessor method name. The method name is optional. If it is not specified, then the object itself is used for the value. index specifies an array index. This parameter requires that the object returned from the data model be either an array or a Java collection that specifies the ability to access its members via an index, such as ArrayList.

Only the native types supported by Java may be manipulated directly. These include int, long, and Boolean. The java.lang.String class is special and can also be accessed directly. All other user defined Java objects are manipulated indirectly by calling the object's toString( ) method.

In the following example, the expression "$(/transaction/current-instance).getTotalDue( )>0" first performs an object lookup from the shared data model using the xpath expression "/transaction/current-instance". Next, the expression locates and calls the getTotalDue method of that object. Finally, the expression compares the long value returned from that method with zero. A true value is returned, if the amount is greater than zero. A false value is returned, if the amount is less than or equal to zero.

A class diagram for the classes used to support JAVA is shown in FIG. 26. Again, the methods available in each class are indicated in the figure. The JAVA support classes are identified in the following table and a brief description of each class follows the table.

| Class Name | Responsibilities |
|---|---|
| | Java |
| com.ncr.statem.StateMachine | Base class providing access to State Machine facilities |
| com.ncr.statem.StateMachine | Base class providing access to multiple State Machine |
| Cluster | instances grouped cooperatively. |
| com.ncr.statem.Action | Base class for Java actions. |
| com.ncr.statem.Message | Equivalent to IMessage in C++ |
| com.ncr.statem.LookupTable | Equivalent to ILookupTable in C++ |

The com.ncr.statem.StateMachine class is the main State Machine class. This class provides the mechanisms for accessing the functionality of the State Machine. It provides:

- Access to the underlying data structures such as LookupTables and Actions
- The ability to send/post messages to the state machine
- Access to the DataModel object, which is used to provide keyed storage for objects for use by the actions.

For each instance of com.ncr.statem.StateMachine there is an underlying C++ CJavaStateMachine object.

The com.ncr.statem.StateMachineCluster class represents a collection of com.ncr.statem.StateMachine instances that cooperate. It is itself an instance of com.ncr.statem.StateMachine and can be used anywhere it is valid to use a com.ncr.statem.StateMachine. It provides the same capabilities as those noted above for the com.ncr.statem.StateMachine above, and routing of messages to the currently active state machine instance. For each instance of com.ncr.statem.StateMachineCluster there is an underlying C++ CJavaCluster object.

The com.ncr.statem.Action class is the interface that all Java actions must implement. There are two methods provided—execute and getResult. The former corresponds to the Execute method of the C++ IAction interface. The latter provides the ability to obtain the return value of true or false. In the C++ world this ability is accomplished by setting the pResult parameter. Parameters are passed by value in Java so this approach is not used. For each com.ncr.statem.Action class generated, an underlying CJavaAction C++ object exists.

The com.ncr.statem.Message class is used as input to the State Machine. This class provides the equivalent of the IMessage in the C++ implementation. For each instance of this class, an underlying CJavaMessage on the C++ side exists.

The com.ncr.statem.LookupTable class provides the equivalent of the ILookupTable in the C++ implementation. There is a one to one correspondence between com.ncr.statem.LookupTable and an ILookupTable instance. For each instance of com.ncr.statem.LookupTable, an underlying ILookupTable object exists.

The C++ Java native classes are identified in the following table and they are briefly described below.

| Class Name | Responsibilities |
|---|---|
| C++ Java Related Classes Non-Transient | |
| CJavaStateMachine | Extended CXMLStateMachine instance providing interface for Java |
| CJavaAction | Base class for Java actions. |
| CJavaMessage | Base class for Java messages. |
| C++ Java Related Classes Transient - Used During Loading Only | |
| CJavaActionProxy | CJavaActionProxy |
| CActionClassHandler | CActionClassHandler |
| CJavaPluginFactory | CJavaPluginFactory |

The CJavaStateMachine class is derived from CXMLStateMachine and provides the functionality required to allow Java actions to be executed from the State Machine.

The CJavaAction class provides the backing store for saving the Class path and other information relevant to invoking the execute method of a corresponding com.ncr.statem.Action.

The CJavaMessage class provides the backing store for saving the JNI information relevant to using the corresponding com.ncr.statem.Message in the State Machine.

The CJavaActionProxy class saves the class information during the loading process. This information is used at a later time to generate the CJavaAction and its corresponding com.ncr.statem.Action.

The CJavaPluginFactory class provides the IPlugin interface necessary to hook the Java support into the State Machine The code described above is used to implement the Java native methods. There are no real classes, however, because the JAVA native interface is implemented with the "C" programming language. The classes and their functions are listed in the following table.

| Class Name | Responsibilities |
|---|---|
| C++ JNI Support Code | |
| StateMachineJavaInterface | Provides JNI code for com.ncr.statem.StateMachine. |
| LookupTableInterface | Provides JNI code for com.ncr.statem.LookupTable. |
| ActionBaseInterface | Provides JNI code for com.ncr.statem.Action. |

The state machine also supports a configuration in which multiple state machines act in a cooperative manner. In this configuration, one state machine is designated the base state machine and is granted "the focus." All messages are directed first to the state machine with the focus. If that state machine does not handle a message, then all others are queried to see which one, if any, can handle that message. If another state machine can handle the message, then it gains the focus and becomes the currently executing state machine.

Each state machine has a resting state defined in the XML definition file. When this state is entered, the state machine loses focus, unless it is the base state machine. State machines are tracked by placing them on a stack. The top of the stack is the currently executing state machine and has the focus. As a new state machine gains focus, it is added to the stack. When a state machine loses focus, it is removed from the top of the stack and returned to the available pool. The new top of the stack regains focus and resumes execution where it left off.

The currently executing state machine can lose focus in two ways. By executing the yield action, a state machine voluntarily gives up the focus to another state machine. The other way of losing focus is to receive a message that the state machine does not handle. This invalidity cause the state machine with "the focus" to yield the focus to another state machine that can handle that message. A set of cooperating state machines is managed by an instance of the CCluster class. This class is responsible for maintaining the stack and delegating responsibilities to the component state machines.

The XML statements that define a cluster have a top level <state-machine-cluster> tag followed by one or more <state-machine> tags identifying the component state machines. The following attributes are allowed on these tags:

The name attribute of both tags is a unique name by which the component can be referenced.

The url attribute identifies the URL of the file containing the XML definition to be used for the state machine.

The library attribute identifies the name of a library containing relevant state machines elements. This library must be loaded before the state machine can be loaded.

A cluster definition may look like the following in XML statements:

```
<?xml version="1.0"?>
<state-machine-cluster name="Fastlane">
  <state-machine name="CustomerMode"
          url="FastLaneCustomerMode.xml"
          library="statemj" default="true"/>
  <state-machine name="StoreMode"
          url ="FastLaneStoreMode.xml"
          library="statemj"/>
  <state-machine name="AssistMode"
          url ="FastLaneAssistMode.xml"
          library="statemj"/>
  <state-machine name="MaintenanceMode"
          url ="FastLaneMaintenanceMode.xml"
          library="statemj"/>
  <state-machine name="ErrorMode"
          url ="FastLaneErrorMode.xml"
          library="statemj"/>
</state-machine-cluster>
```

A modal state machine is one in which the default behavior for handling unknown messages has been altered. Rather than passing control and the message to another member of the cluster, a modal state machine queues the messages until an explicit <yield> tag is encountered. At this point, the modal state machine yields control to another state machine and resends all the messages that have been queued. A modal state machine is defined by adding the modal=attribute to the <state-machine> tag:

```
<state-machine modal="true">
...
</state-machine>
```

To prepare for operation, a state machine implementation is designed and written with a specification language, such as XML. The specification language statements in the definition include actions that invoke executable computer code that implements system functions on the business platform, such as a checkout station. The specification file containing the specification language statements is stored on a hard drive or the like of the business platform. The parser application program is also stored on the hard drive or in the memory of the business platform for execution by the processor controlling the business system.

To commence operation, the state machine implementation is initialized and provided with a worker thread. The parser begins interpreting the specification language statement of the state machine definition. This interpretation includes invoking the business logic modules of the business platform and evaluating the returned values to continue parsing the specification language statements. The parsing of the state machine implementation definition continues until the state machine reaches a termination point. Thereafter, the state machine implementation requires re-initialization before parsing of the implementation begins again.

To modify the operation of the business system, unless the business platform has been modified, the only changes required are those required for the business logic. Because the business logic is written in a specification language, the structures inside the specification file may be changed without requiring recompilation and another installation of computer code in the system. Instead, a new version of the specification language file is written to the hard drive. The new version is then verified upon initialization and then parsing of the new specification file begins to control the business system.

While the present invention has been illustrated by the description of exemplary processes and system components, and while the various processes and components have been described in considerable detail, applicant does not intend to restrict or in any limit the scope of the appended claims to such detail. Additional advantages and modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A checkout business system controlling the operation of a checkout station that implements a plurality of the state machines each implementing a different method of operating the checkout business system, the system comprising:

a memory including computer instructions;

a processor coupled to the memory and adapted to execute the computer instructions;

a plurality of specification language files stored in a permanent memory on the checkout station, each specification language file containing a plurality of specification language statements defining a state machine implementation of a different checkout business system where each state machine defines all the operations of the checkout station and where the checkout station is operable to generate an instance of the state machine during a system initialization process for the checkout station;

a parser operable to extract specification language statements from each of the specification language files and validate the structure of the specification language statements during the generation of the instance of each of the state machines and interpret the extracted specification language statements in the instance of each of the state machines;

a business logic application program comprised of business logic modules, the business logic modules including executable compiled program statements that when executed by the processor perform a checkout station action;

a focus variable operable to identify from the plurality of specification language files the specification language file for the state machine currently being interpreted where multiple state machines can be running simultaneously; and where the parser is operable to call at least one of the business logic modules to process a message extracted by the parser from a specification language statement and to change the status of the focus variable to another specification language statement file when the current specification language statement file being interpreted fails to have a method to process the message.

2. The system of claim 1, the parser comprising:

an expression interpreter for locating expression tags in the specification language statements and interpreting the specification language statements between corresponding tags in accordance with the located expression tags;

a method invoker for calling business logic modules, the invoker using messages extracted by the parser from the specification language statements to support the business logic module calls.

3. The system of claim 2 further comprising:

a Java support interface in a Java application for generating a state machine and invoking actions implemented in one of a Java class and a C++ object.

4. The system of claim 1, the business logic modules being programming language objects.

5. The system of claim 4, the programming language objects being one of a C++ object and a Java object.

6. The system of claim 1 further comprising:

a plurality of specification files, each of which contains specification language statements defining a state machine implementation of a checkout business system; and the parser maintaining a focus variable identifying the specification file currently being parsed.

7. The system of claim 6, wherein the parser changes focus status in response to the state machine implementation defined by the specification language statements in the specification language file being parsed failing to have a method for processing a message.

8. The system of claim 1, the specification language statements being written in Extensible Markup Language (XML) statements.

9. The system of claim 4, the parser being an application program executed by the processor of the checkout station.

10. The system of claim 1, the checkout station action including reading a bar code.

11. A computer implemented method that controls the operation of a checkout station and implements a plurality of state machines each implementing a different method of operating the checkout business system, the method comprising:

receiving a plurality of specification language files wherein each specification language file contains specification language statements that define a state machine implementation of a different checkout business system where the state machine defines all the operations of the checkout station and wherein the plurality of specification language files are stored in a permanent memory on the checkout station;

extracting, using a parser, specification language statements from each of the plurality of specification language files and validating the structure of each state machine defined by the plurality of specification language statements in each of the plurality of specification language files;

generating an instance of each state machine by interpreting one of the plurality of specification language statements from each of the plurality of specification language statements files during a system initialization process for the checkout station;

setting a focus variable to identify one of the plurality of specification language files being used to interpret the current state machine wherein multiple state machines can be running simultaneously;

interpreting one of the plurality of specification language statements from the one of the plurality of specification language files identified by the focus variable;

calling a business logic module identified in the interpreted specification language statement where the business logic module contains executable compiled program statements that process a message extracted from the interpreted specification language statement and where the business logic module performs a checkout station action; and changing the focus variable to another of the specification language files when the current specification language file being interpreted fails to have a method to process the message.

12. The method of claim 11, the interpreting one of the plurality of specification language statements further comprising:

locating expression tags in the specification language statement;

interpreting the specification language statement between corresponding tags in accordance with the located expression tags;

calling a business logic module using a message extracted from the specification language statement.

13. The method of claim 12 further comprising:

calling Java action classes through a Java support interface included in a definition of a state machine implementation.

14. The method of claim 11, the calling of a business logic module further comprising:

invoking a method in a programming language object.

15. The method of claim 11, the interpretation of specification language statements further comprising:

interpreting Extensible Markup Language (XML) statements.

16. The method of claim 11 wherein the specification language statement interpretation includes:

executing an application program with a processor of the checkout business system.

17. The method of claim 11, the calling of a business logic module including:

invoking a programming language object.

18. The method of claim 17, the invocation of a programming language object including:

invoking one of a C++ object and a Java object.

19. The method of claim 11, the checkout station action including reading a bar code.

* * * * *